(12) United States Patent
Watanabe et al.

(10) Patent No.: US 11,089,173 B2
(45) Date of Patent: *Aug. 10, 2021

(54) SCANNER APPARATUS

(71) Applicant: SEIKO EPSON CORPORATION, Tokyo (JP)

(72) Inventors: Yuta Watanabe, Matsumoto (JP); Koji Higuchi, Shiojiri (JP); Naohiro Ueyama, Matsumoto (JP); Motofumi Otani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/886,852

(22) Filed: May 29, 2020

(65) Prior Publication Data

US 2020/0296240 A1 Sep. 17, 2020

Related U.S. Application Data

(63) Continuation of application No. 16/368,178, filed on Mar. 28, 2019, now Pat. No. 10,708,457.

(30) Foreign Application Priority Data

Mar. 28, 2018 (JP) .............................. JP2018-062736
Mar. 28, 2018 (JP) .............................. JP2018-062737

(51) Int. Cl.
*H04N 1/00* (2006.01)
*B65H 5/06* (2006.01)
*G02B 26/10* (2006.01)

(52) U.S. Cl.
CPC ......... *H04N 1/00602* (2013.01); *B65H 5/062* (2013.01); *G02B 26/10* (2013.01); *H04N 1/00519* (2013.01)

(58) Field of Classification Search
CPC ........... H04N 1/00602; H04N 1/00013; H04N 1/00018; H04N 1/00092;
(Continued)

(56) References Cited

U.S. PATENT DOCUMENTS 5,267,009 A 11/1993 Takada
5,624,107 A 4/1997 Deguchi
(Continued)

FOREIGN PATENT DOCUMENTS

JP 2009-278257 A 11/2009
JP 2013-216455 A 10/2013

*Primary Examiner* — Negussie Worku
(74) *Attorney, Agent, or Firm* — Workman Nydegger

(57) ABSTRACT

A scanner apparatus includes a housing including an insertion port into which a medium is inserted, a discharge port from which the medium is discharged, a conveying roller configured to convey the medium inserted from the scanning insertion port, and a scanning unit configured to scan the medium conveyed by the conveying roller. The scanning insertion port and the discharge port are provided on a +Y direction side of the housing. The housing includes a placement face extending in a −Y direction from the scanning insertion port. The placement face, when a first end of the medium is inserted into the scanning insertion port, is able to support a portion of the medium on a second end side opposite to the first end. The first end of the medium is discharged from the discharge port in a direction on the +Y direction side or in a −Z direction.

10 Claims, 11 Drawing Sheets

(58) Field of Classification Search
CPC .......... H04N 1/00519–00679; H04N 1/00681–00761; H04N 1/00785–00827; H04N 1/00835; H04N 1/00909; H04N 1/024–0318; H04N 1/04–207; H04N 2201/024–04798; G02B 26/10; B65H 5/062; B65H 2601/11; B65H 2801/15; B65H 2801/39; B65H 2407/21; B65H 2701/11312; B65H 2404/611; B65H 3/68; B65H 2404/1531; B65H 5/06; B41J 3/445

USPC ............................................. 358/474, 498

See application file for complete search history.

(56) References Cited

U.S. PATENT DOCUMENTS

| | | | |
|---|---|---|---|
| 8,144,372 B2* | 3/2012 | Sugahara | H04N 1/10 358/474 |
| 8,618,709 B2* | 12/2013 | Inagaki | H02K 21/14 310/156.57 |
| 9,809,407 B2* | 11/2017 | Anayama | B65H 16/005 |
| 10,023,418 B2* | 7/2018 | Asai | B65H 31/04 |
| 10,207,525 B2* | 2/2019 | Saita | B41J 13/076 |
| 10,599,658 B2* | 3/2020 | Watanabe | G06F 16/248 |
| 10,708,457 B2* | 7/2020 | Watanabe | H04N 1/00602 |
| 10,717,610 B1* | 7/2020 | Daboub | B65G 47/844 |
| 2005/0057785 A1* | 3/2005 | Endo | H04N 1/00591 358/474 |
| 2012/0013660 A1 | 1/2012 | Mano | |
| 2012/0200186 A1 | 8/2012 | Sano et al. | |
| 2014/0111586 A1 | 4/2014 | Kumai | |
| 2017/0046397 A1 | 2/2017 | Watanabe | |
| 2017/0106683 A1 | 4/2017 | Watanabe | |
| 2017/0272595 A1* | 9/2017 | Yamaguchi | H04N 1/00535 |
| 2017/0352672 A1 | 12/2017 | Sakamoto | |
| 2018/0056673 A1 | 3/2018 | Suzuki | |
| 2018/0113657 A1 | 4/2018 | Takahashi | |
| 2018/0250963 A1 | 9/2018 | Ueyama | |
| 2018/0272700 A1 | 9/2018 | Ito | |
| 2018/0342311 A1 | 11/2018 | Watanabe | |
| 2019/0193975 A1 | 6/2019 | Hamano | |
| 2019/0248144 A1 | 8/2019 | Nakashima | |
| 2019/0283472 A1 | 9/2019 | Honda | |
| 2019/0284007 A1 | 9/2019 | Honda | |
| 2019/0300316 A1 | 10/2019 | Watanabe | |

* cited by examiner

FIG. 1

SCANNER APPARATUS

The present application is a continuation of U.S. patent application Ser. No. 16/368,178, filed Mar. 28, 2019, which is based on and claims priorities from JP Application Serial Number 2018-062736, filed Mar. 28, 2018, and JP Application Serial Number 2018-062737, filed Mar. 28, 2018, the disclosures of which are hereby incorporated by reference herein in their entirety.

BACKGROUND

1. Technical Field

The disclosure relates to a scanner apparatus configured to scan a medium.

2. Related Art

Scanner apparatuses configured to scan a medium have been known. When a medium is inserted from an insertion port of a housing in a scanner apparatus, the medium is scanned by a scanning unit in the housing. Then, the medium is discharged from a discharge port of the housing (JP-A-2013-216455, for example). In the scanner apparatus disclosed in JP-A-2013-216455, the insertion port and the discharge port are provided on a same direction side of the housing. As a result, user convenience is improved.

Nevertheless, in the scanner apparatus disclosed in JP-A-2013-216455, a portion of the medium discharged from the discharge port may mutually interfere with a portion of the medium that has not been inserted into the insertion port. In other words, the medium discharged from the discharge port may be inserted into the insertion port again. This affects conveyance of the medium.

Thus, in the scanner apparatus of the related art, to ensure that the portion of the medium discharged from the discharge port does not interfere with the portion of the medium that has not been inserted into the insertion port, a support unit that supports the medium needs to be provided or the user needs to support the medium. When a support unit is provided to support the medium, the size of the scanner apparatus increases. Further, when the user supports the medium, user convenience is lessened.

SUMMARY

The disclosure is made in light of such circumstances, and an advantage of some aspects of the disclosure is to provide a scanner apparatus capable of suppressing an increase in a size of the apparatus while enhancing or improving user convenience.

Hereinafter, measures for eliminating the above-described issues and advantages of the measures will be described.

According to an aspect of the disclosure, a scanner apparatus includes a housing, a conveying roller, and a scanning unit. The housing includes a scanning insertion port into which a medium is inserted, a scanning discharge port from which the medium is discharged. The conveying roller is configured to convey the medium inserted from the scanning insertion port. The scanning unit is configured to scan the medium conveyed by the conveying roller. The scanning insertion port and the scanning discharge port are provided on a first direction side of the housing. In one example, the first direction side intersects a vertical direction and an axial direction of the conveying roller. The housing includes a placement face extending in a second direction. The second direction is an opposite direction to the first direction, from the scanning insertion port. The placement face, when a first end of the medium is inserted into the scanning insertion port, is able to support a portion of the medium on a second end side opposite to the first end. The first end of the medium is discharged from the scanning discharge port in a direction on the first direction side or in a vertically downward direction.

According to this configuration, the scanning insertion port and the scanning discharge port are both provided on the first direction side of the housing. Further, the direction in which the medium is discharged may be the vertically downward direction or a direction on the first direction side. Thus, a task of inserting the medium into the insertion port and handling the medium discharged from the discharge port can be performed from the same first direction side. Accordingly, user convenience can be enhanced. Furthermore, the scanner apparatus allows the second end side of the medium to be placed on the placement face of the housing when the first end is inserted into the insertion port. As a result, mutual interference between the first end side and the second end side of the medium can be suppressed without providing a support unit that supports the second end side of the medium. Accordingly, an increase in size of the apparatus can be suppressed.

According to another aspect of the disclosure, in the scanner apparatus, the housing further includes an accommodating unit configured to accommodate a printing medium wound into a roll shape, and an accommodating unit cover. A conveying path along which the medium is conveyed by the conveying roller extends in a direction from the scanning insertion port to the scanning discharge port. The accommodating unit is provided on the second direction side of the housing, and an outer surface of the accommodating unit is included in the placement face.

According to this configuration, the scanning insertion port and the scanning discharge port are both provided on the first direction side of the housing, and the conveying path of the medium by the conveying roller extends in a direction from the scanning insertion port toward the scanning discharge port. As a result, a length, in the vertical direction above the placement face of the housing, occupied by the constituent elements for scanning the medium is small compared to when a configuration is adopted in which the conveying path of the medium is looped back in a U shape. Thus, even when the constituent elements for scanning the medium are configured to be disposed on the first direction side of the accommodating unit, user access to the accommodating unit from the first direction side of the scanner apparatus is less likely to be impeded. Accordingly, the accommodating unit can be easily accessed from the first direction side of the housing. Then, with the outer surface of the accommodating unit cover constituting at least a portion of the placement face, a placement face having a wide surface area is achieved.

According to a further aspect of the disclosure, in the scanner apparatus, the scanning discharge port is positioned vertically lower than the placement face and the scanning insertion port of the housing.

According to this configuration, the scanning discharge port is positioned vertically lower than the placement face and the scanning insertion port of the housing. As a result, the conveying path of the medium by the conveying roller includes a component in the vertically downward direction. Thus, the lengths, in the first direction and the second direction, of the conveying path of the medium can be decreased. That is, in the housing, the scanning insertion port can be brought closer to the first direction side. Accordingly, the medium can be easily inserted into the scanning insertion port.

According to a still further aspect of the disclosure, the scanner apparatus further includes a printing unit configured to perform printing on a printing medium. The housing includes a printing discharge port from which the printing medium printed by the printing unit is discharged. The printing discharge port is provided on the first direction side of the housing. The printing medium printed by the printing unit is discharged from the printing discharge port in a direction on the first direction side or in the vertically downward direction.

According to this configuration, the direction in which the medium scanned by the scanning unit is discharged, and the direction in which the printing medium printed by the printing unit is discharged are directions on the first direction side or vertically downward direction. As a result, the medium scanned by the scanning unit and the printing medium printed by the printing unit can be handled from the first direction side of the housing.

According to a still further aspect of the disclosure, the scanner apparatus further includes a holding mechanism configured to hold the medium inserted from the scanning insertion port. The housing includes an assisting symbol for assisting determination of an insertion position of the medium relative to the scanning insertion port. The holding mechanism and the assisting symbol are provided on the first direction side of the housing.

The holding mechanism and the assisting symbol are used by a user when inserting the medium into the scanner apparatus. The holding mechanism and the assisting symbol are provided on the first direction side of the housing in the same manner as the scanning insertion port and the scanning discharge port. Accordingly, a task of inserting the medium into the scanning insertion port is easy.

According to a still further aspect of the disclosure, the scanner apparatus includes a first face of a surface of the housing, the first face facing a vertically upward direction and including the scanning insertion port, a second face extending in a direction intersecting the first face, and a scanning unit cover including the scanning unit or a region facing the scanning unit. The scanning unit cover is movable to a first position that allows the medium to be scanned by the scanning unit, and to a second position that cause a scanning position by the scanning unit to be exposed. When the scanning unit cover is positioned in the first position, an outer surface of the scanning unit cover is included in the second face.

According to this configuration, the scanning position by the scanning unit can be exposed by moving the scanning unit cover from the first position to the second position. As a result, maintenance of the scanning unit and processing such as elimination of a medium jam are easy. Then, the outer surface of the scanning unit cover is included in the second face extending in a direction intersecting the first face facing the vertically upward direction. That is, the scanning unit cover constitutes an end of the scanner apparatus in a direction intersecting the vertical direction. Thus, a surface area of the first face applicable as a placement face can be increased. Accordingly, user convenience can be enhanced.

According to a still further aspect of the disclosure, the scanner apparatus further includes an accommodating unit configured to accommodate a medium wound into a roll shape, and an accommodating unit cover. An outer surface of the accommodating unit cover is included in the first face.

According to this configuration, the outer surface of the scanning unit cover is included in the second face and thus, even when the scanning unit cover is moved to the second position, the scanning unit cover is kept from interfering with access to the accommodating unit cover.

According to a still further aspect of the disclosure, in the scanner apparatus, the scanning unit cover is configured to pivot to the first position and the second position about a pivoting shaft.

According to this configuration, the scanning unit cover can be easily moved compared to a configuration in which the scanning unit cover is moved by being slid.

According to a still further aspect of the disclosure, in the scanner apparatus, a length of the scanning unit cover in an axial direction of the pivoting shaft is greater than a length of the scanning unit cover in a direction orthogonal to the axial direction.

According to this configuration, a space required when pivoting the scanning unit cover can be decreased.

According to a still further aspect of the disclosure, the scanner apparatus further includes a conveying roller configured to convey a medium inserted from the scanning insertion port to the scanning position. An axial direction of the pivoting shaft is parallel with an axial direction of the conveying roller. The pivoting shaft is positioned on a vertically downward direction side of the scanning unit cover. The scanning unit is positioned on a vertically upward direction side of the pivoting shaft when the scanning unit cover is positioned in the first position.

According to this configuration, the scanning unit cover pivots about a shaft on the vertically downward direction side of the scanning unit. That is, the scanning unit cover pivots in a gravity direction. As a result, a special mechanism no longer needs to be provided to maintain the scanning unit cover in the second position.

According to a still further aspect of the disclosure, the scanner apparatus further includes a printing unit configured to perform printing on a medium. The second face includes a printing discharge port from which the medium printed by the printing unit is discharged.

According to this configuration, the printing discharge port is provided on the second face in which the outer surface of the scanning unit cover is included. As a result, the user can handle the scanning unit cover and the medium printed by the printing unit from the same direction side.

BRIEF DESCRIPTION OF THE DRAWINGS

FIG. 1 is a perspective view of an example scanner apparatus when a scanning unit cover is positioned in a closed position.

DESCRIPTION OF EXEMPLARY EMBODIMENTS

An exemplary embodiment of a scanner apparatus will be described below. The scanner apparatus may be configured as a multifunction apparatus having a printing function in addition to a scanning function. In the scanner apparatus, the printing function is achieved by an ink jet method of printing by discharging ink, which is an example of a liquid, onto a medium such as a sheet.

Figure 1:
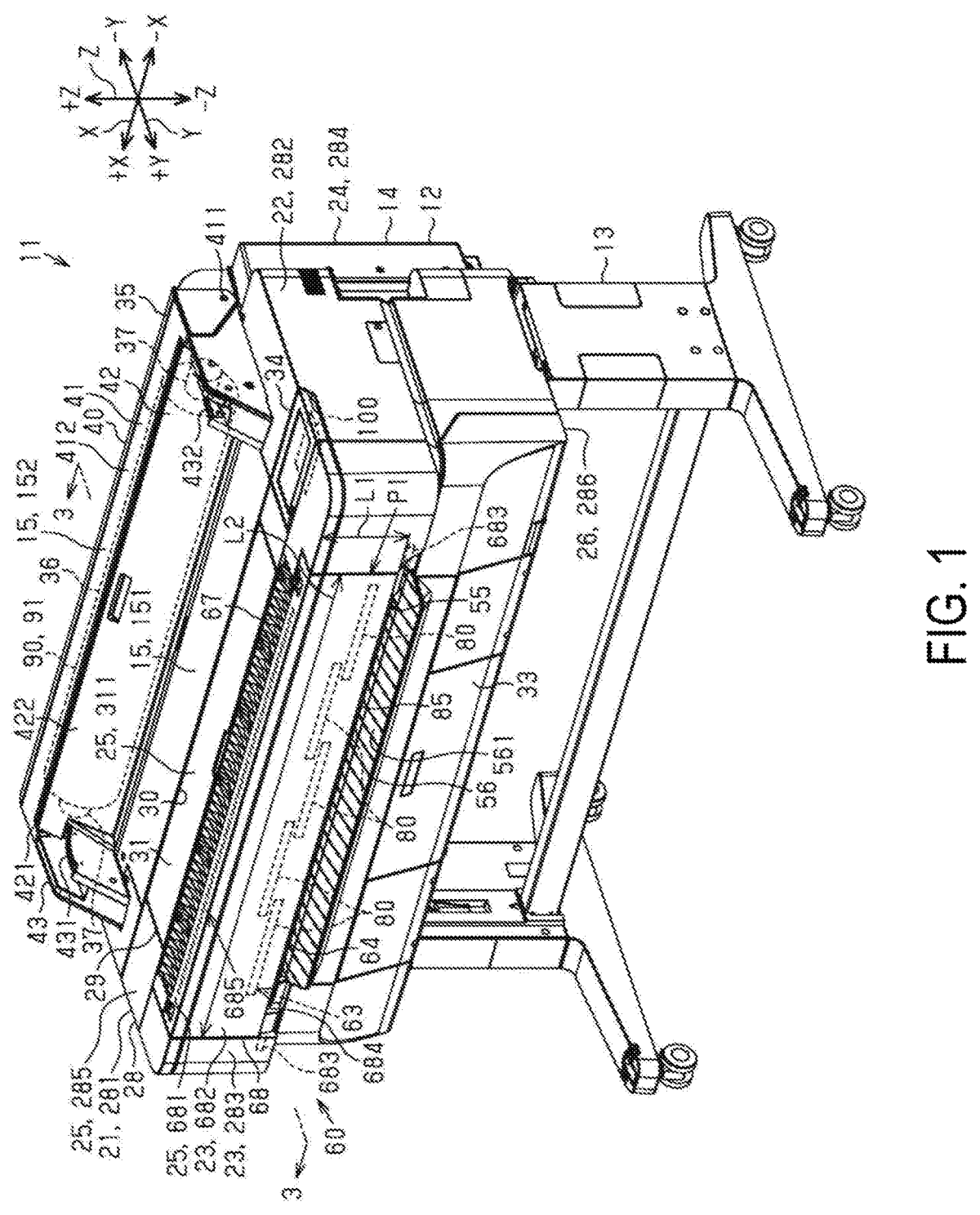
Figure 2:
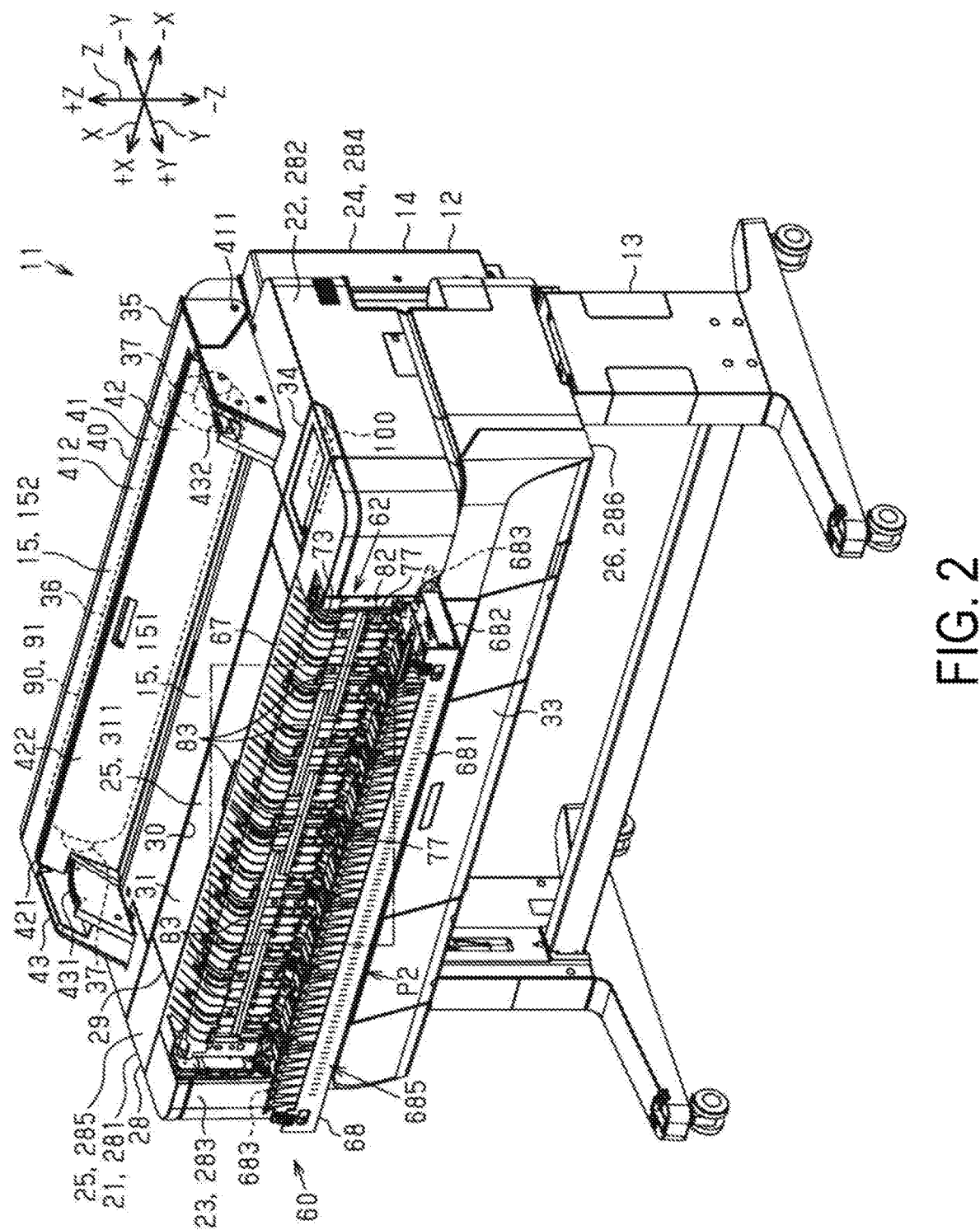
FIG. 2 is a perspective view of the scanner apparatus when the scanning unit cover is positioned in an open position.
Figure 3:
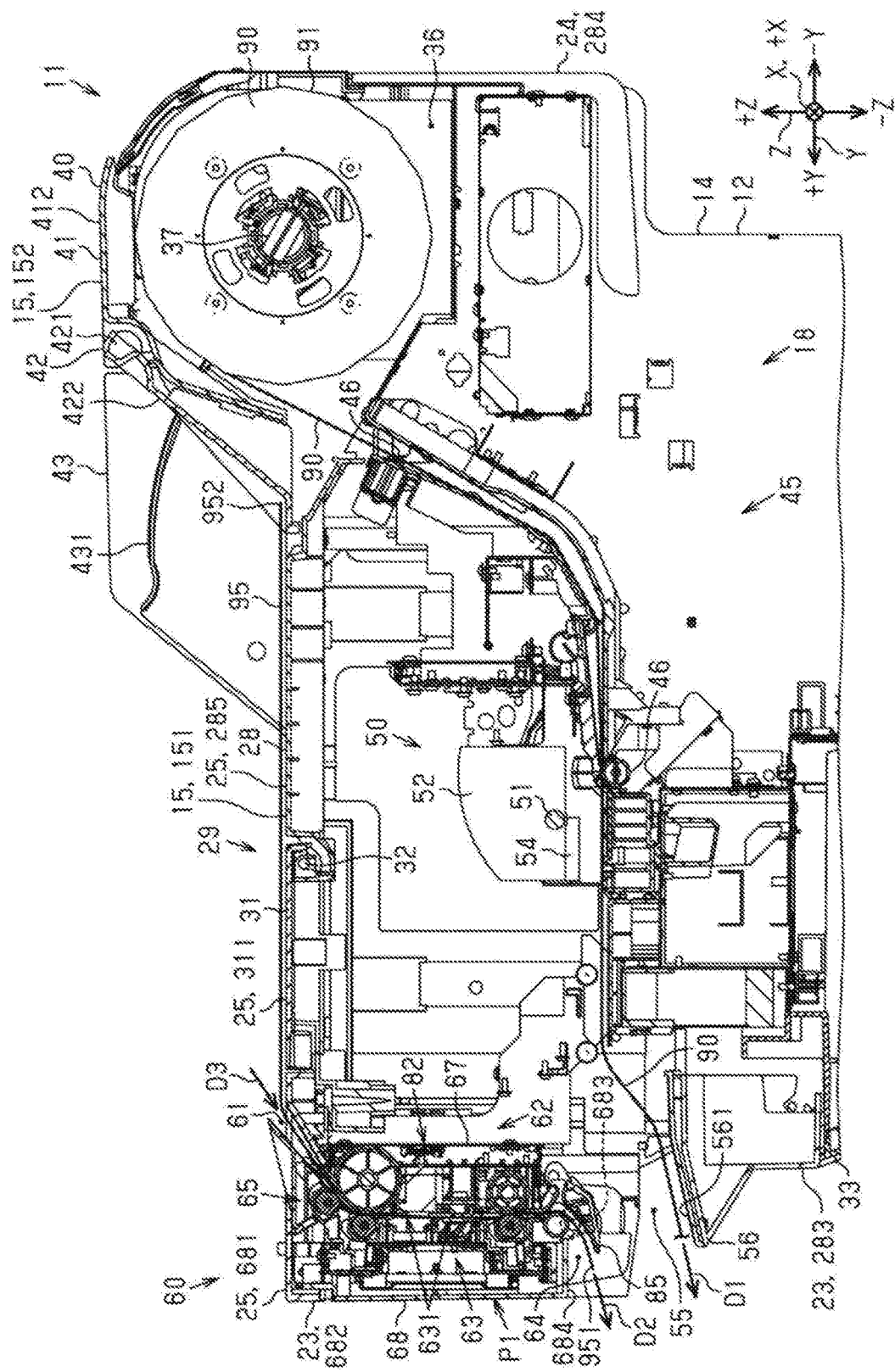
FIG. 3 is a cross-sectional view taken in a direction of an arrow along line 3-3 in FIG. 1.

As illustrated in FIG. 1 to FIG. 3, the scanner apparatus 11 includes a main body 12. Legs 13 support the main body 12. The main body 12 has a height, a depth, and a width of predetermined lengths. In the exemplary embodiment, a width direction and a depth direction are substantially horizontal, and the scanner apparatus 11 is placed on a horizontal surface. Then, a vertical direction, the depth direction, and the width direction are indicated using a Z axis, a Y axis, and an X axis intersecting the Z axis and the Y axis, respectively. The X axis, the Z axis, and the Y axis are coordinate axes indicating the lengths of the width, height, and depth, respectively.

In the descriptions below, the width direction is referred to as an X axis direction. One direction in the X axis direction is referred to as a +X direction and the other direction in the X axis direction is referred to as a −X direction. The depth direction is referred to as a Y axis direction. One direction in the Y axis direction is referred to as a +Y direction, which is an example of a first direction, and the other direction in the Y axis direction is referred to as a −Y direction, which is an example of a second direction. Further, the vertical direction is referred to as a Z axis direction. The vertically downward direction is referred to as a −Z direction, and the vertically upward direction is referred to as a +Z direction.

In the descriptions below, the terms top, bottom, left, right, front, and rear may be used for ease of explanation. These directions or terms are used with reference to a user when it is assumed that the user is on the +Y direction side of the scanner apparatus 11.

The main body 12 includes a left-side face 21 facing the +X direction, a right-side face 22 facing the −X direction, a front face 23, which is an example of a second face, facing the +Y direction, a rear face 24 facing the −Y direction, a top face 25, which is an example of a first face, facing the +Z direction, and a bottom face 26 facing the −Z direction. The front face 23 extends in a direction intersecting the top face 25. The main body 12 has a substantially rectangular box-like shape.

The main body 12 includes an exterior casing 28. The exterior casing 28 includes a left-side face 281 facing the +X direction, a right-side face 282 facing the −X direction, a front face 283 facing the +Y direction, a rear face 284 facing the −Y direction, a top face 285 facing the +Z direction, and a bottom face 286 facing the −Z direction. The top face 285 of the exterior casing 28 constitutes a flat face extending in the X axis direction and the Y axis direction.

The exterior casing 28 includes a viewing window 29 that allows an interior of the main body 12 to be viewed. The viewing window 29 has a predetermined depth in the Y axis direction, and extends in the X axis direction. The viewing window 29 includes a viewing hole 30 that opens in the +Z direction, and a viewing hole cover 31 capable of covering the viewing hole 30.

The viewing hole cover 31 of the exemplary embodiment may be made of a transparent material. This makes it possible to visually recognize an interior of the exterior casing 28. Note that the viewing hole cover 31 may be semi-transparent or opaque. The viewing hole cover 31 is configured to be pivotable about a viewing hole cover shaft 32 extending in the X axis direction. When the viewing hole cover 31 is pivoted to an open position on the +Z direction side, the viewing hole 30 is opened. When the viewing hole cover 31 is pivoted to a closed position on the −Z direction side, the viewing hole 30 is closed. The viewing hole cover 31 includes a top face 311 facing the +Z direction. When the viewing hole cover 31 is in the closed position, the top face 311 constitutes a flat face extending in the X axis direction and the Y axis direction.

The main body 12 includes a holding unit 33 that detachably holds a liquid accommodating body (not illustrated in FIG. 1) that accommodates a liquid such as ink, an operation unit 34 configured to operate the scanner apparatus 11, and an accommodating unit 35 capable of accommodating a printing medium 90 having an elongated shape. The accommodating unit 35 is provided to or located at an end of the main body 12 on the −Y direction side. In the description below, a simple reference to "the medium 90" refers to the printing medium 90. The medium 90 is an example of a printing medium.

The accommodating unit 35 includes an accommodating space 36 capable of accommodating a medium roll 91 formed by winding the medium 90 into a roll shape (refer to FIG. 3). The accommodating space 36 opens in the +Z direction in one example. The accommodating unit 36 includes a support unit 37 that supports the medium roll 91. When accommodated in the accommodating unit 36, the medium roll 91 is rotatable about an axis line of the medium roll 91 inside the accommodating space 36. The medium 90 is fed out by rotation of the medium roll 91.

The main body 12 includes an accommodating unit cover 40 capable of covering the accommodating space 36 of the accommodating unit 35. The accommodating unit cover 40 includes, in one example, a first accommodating unit cover 41 and a second accommodating unit cover 42. The first accommodating unit cover 41 can cover a portion of an opening of the accommodating space 36 on the −Y direction side. The second accommodating unit cover 42 can cover a portion of the opening of the accommodating space 36 on the +Y direction side.

The first accommodating unit cover 41 is capable of pivoting in the Y axis direction about a shaft 411, which is an end on the −Y direction side (refer to FIG. 1). An axis line of the shaft 411 extends in the X axis direction. When the first accommodating unit cover 41 is pivoted to an open position on the −Y direction side, the accommodating space 36 is opened. When the first accommodating unit cover 41 is pivoted to a closed position on the +Y direction side, the accommodating space 36 is closed.

The second accommodating unit cover 42 is capable of pivoting in the Y axis direction about a shaft 421, which is an end on the −Y direction side. Further, the main body 12 includes a cover support unit 43 protruding in the +Z direction, in a position adjacent to an outer side of the accommodating unit 35 in the X axis direction (refer to FIG. 1). The cover support unit 43 supports the shaft 411 and the shaft 421. Further, the cover support unit 43 supports the support unit 37. The cover support unit 43 includes a left cover support unit 431 on the +X direction side, and a right cover support unit 432 on the −X direction side of the accommodating unit 35. The left cover support unit 431 and the right cover support unit 432 are wall-shaped portions extending in the Y axis direction.

When the second accommodating unit cover 42 is pivoted to the open position on the +Y direction side (in a clockwise direction in FIG. 3), the accommodating space 36 is opened. When the second accommodating unit cover 42 is pivoted to the closed position on the −Y direction side (in a counterclockwise direction in FIG. 3), the accommodating space 36 is closed.

Note that FIG. 1 to FIG. 3 illustrate a state where the first accommodating unit cover 41 and the second accommodating unit cover 42 are in closed positions. When the accommodating space 36 is opened by pivoting the first accommodating unit cover 41 and the second accommodating unit cover 42, the medium roll 91 can be replaced.

When the first accommodating unit cover 41 is closed, an outer surface 412 of the first accommodating unit cover 41 constitutes a flat face or surface facing the +Z direction. When the second accommodating unit cover 42 is closed, an outer surface 422 of the second accommodating unit cover 42 constitutes an inclined face extending upward in the +Z direction increasingly in the −Y direction.

As illustrated in FIG. 3, the scanner apparatus 11 includes a printing conveying unit 45 configured to convey the medium 90 fed out from the medium roll 91 accommodated by the accommodating unit 35. The printing conveying unit 45 includes a printing conveying roller 46 and a printing conveying motor (not illustrated in FIG. 3) configured to drive the printing conveying roller 46. In the description below, a simple reference to "the conveying unit 45" refers to the printing conveying unit 45.

The scanner apparatus 11 includes a printing unit 50 configured to perform printing on the medium 90. The medium 90 is conveyed to the printing unit 50 by the conveying unit 45. The printing unit 50 includes a guide shaft 51 extending in the X axis direction, a mobile body 52 supported by the guide shaft 51, and a printing motor (not illustrated in FIG. 3) configured to move the mobile body 52 back and forth along the guide shaft 51. The printing unit 50 includes a liquid discharge head 54 attached to a −Z direction side of the mobile body 52.

The medium 90 conveyed by the conveying unit 45 passes the −Z direction side of the liquid discharge head 54 in the Y axis direction. The liquid discharge head 54 discharges liquid in the −Z direction while being moved back and forth in the X axis direction. In the scanner apparatus 11, printing is performed by discharging liquid from the liquid discharge head 54. The discharged liquid adheres to the medium 90.

While the liquid discharge head 54 may be a serial type head, the type is not limited thereto. The type may be a line type head that extends across the medium 90 in its entirety in the X axis direction. In the exemplary embodiment, the accommodating unit 35, the conveying unit 45, and the printing unit 50 constitute a printing function unit 18.

The main body 12 includes a printing discharge port 55. The medium 90 printed by the printing unit 50 is discharged from or through the discharge port 55. The printing discharge port 55 opens in the +Y direction on the front face 23 of the main body 12. The printing discharge unit 55 extends in the X axis direction. In the description below, simple reference to "the discharge port 55" refers to the printing discharge port 55.

The main body 12 includes a guide plate 56 on the −Z direction side of the discharge port 55. The guide plate 56 protrudes in the +Y direction on the front face 23 of the main body 12. The guide plate 56 includes a guide face 561 facing the +Z direction. The guide face 561 may be inclined downward in the −Z direction increasingly in the +Y direction.

The medium 90 printed by the printing unit 50 is guided by the guide face 561 when discharged from the discharge port 55. As a result, a discharge direction D1 of the medium 90 in the discharge port 55 may be orthogonal to the X axis direction, may intersect the Y axis direction, and may be inclined in the −Z direction. Generally, the direction in which the medium 90 printed by the printing unit 50 is discharged from the discharge port 55 is a direction on the +Y direction side. Note that, in this example, when a certain direction includes a component in a predetermined direction, the direction is on the predetermined direction side. That is, the direction in which the medium 90 is discharged from the discharge port 55 includes a component of the +Y direction.

As illustrated in FIG. 1 to FIG. 5, the main body 12 includes a scanning function unit 60 configured to scan a scanning medium 95. In the description below, simple reference to "the medium 95" refers to the scanning medium 95. The medium 95 is an example of a scanning medium. The medium 95 may be an object scanned by the scanning function unit 60. The scanning function unit 60 is provided to an end of the main body 12 on the +Y direction side. The scanning function unit 60 may have a box shape extending in the X axis direction.

An overview of the scanning function unit 60 is described below.

Figure 5:
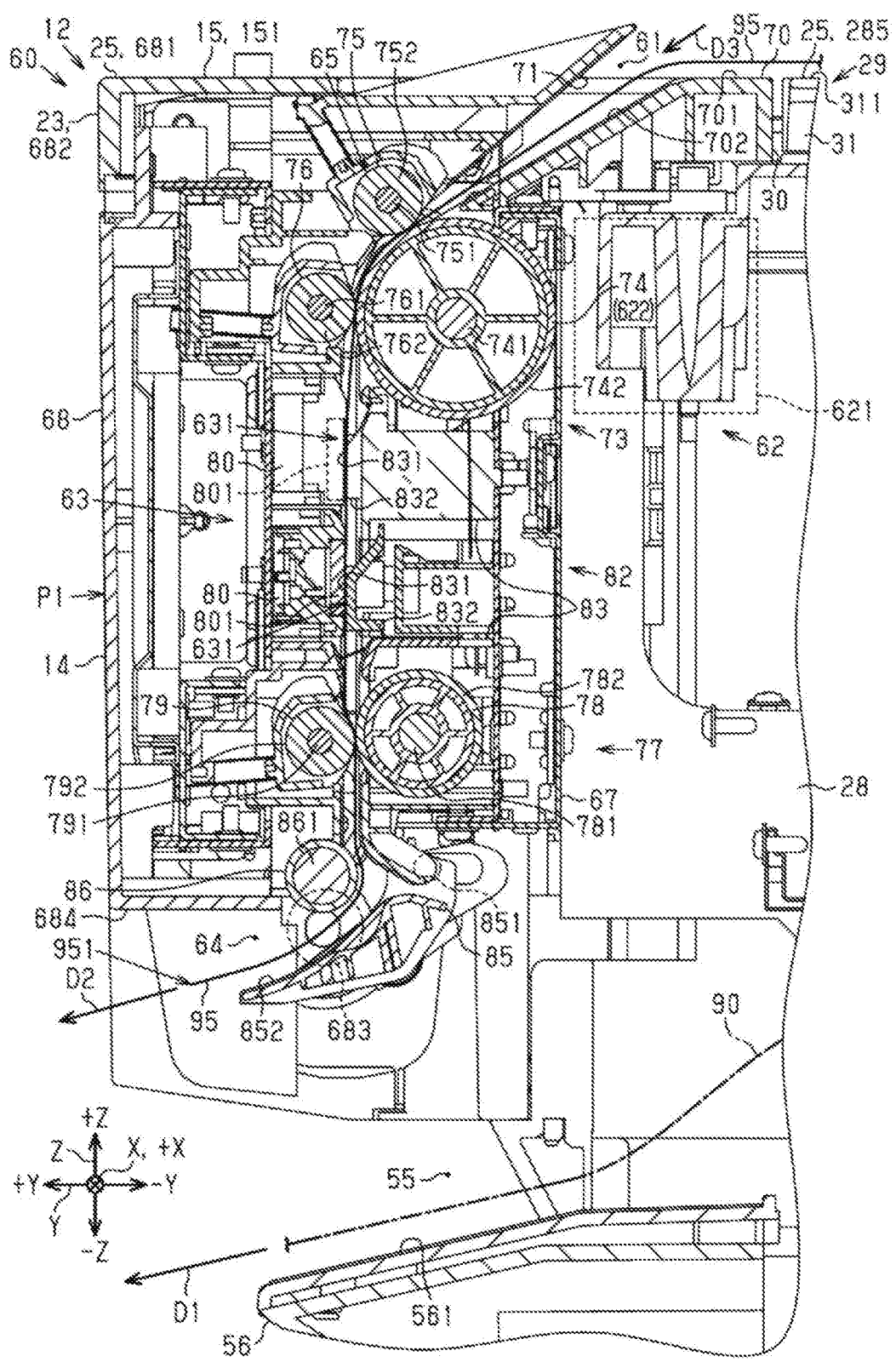
FIG. 5 is a cross-sectional view illustrating a portion of FIG. 3, enlarged.

As illustrated in FIG. 5, the scanning function unit 60 includes a scanning insertion port 61 in which the medium 95 is inserted, a scanning conveying unit 62 configured to convey the medium 95 inserted from or into the scanning insertion port 61 in the conveying direction, a scanning unit 63 configured to scan the medium 95 conveyed by the conveying unit 62, and a scanning discharge port 64 configured to discharge the medium 95 scanned by the scanning unit 63. In the descriptions below, a simple reference to "the insertion port 61" refers to the scanning insertion port 61, a simple reference to "the conveying unit 62" refers to the scanning conveying unit 62, and a simple reference to "the discharge port 64" refers to the scanning discharge port 64.

The scanning function unit 60 includes a fixing unit 67 fixed to an end of the main body 12 on the +Y direction side, and a scanning unit cover 68 supported in an openable and closable manner relative to the fixing unit 67. The insertion port 61, the conveying unit 62, the scanning unit 63, and the discharge port 64 are configured by a member provided to one of the fixing unit 67 and the scanning unit cover 68, or by a member divided and provided to both. Further, in the scanning function unit 60, the conveying path through which the medium 90 passes is configured as a space between the fixing unit 67 and the scanning unit cover 68 when the scanning unit cover 68 is closed.

The details of the structure of the scanning function unit 60 are described below.

As illustrated in FIG. 1 and FIG. 2, the scanning unit cover 68 has a rectangular plate shape extending in the X axis direction. The scanning unit cover 68 includes a top face 681 facing the +Z direction, a front face 682, which is as an example of an outer surface, facing the +Y direction, and a bottom face 684 facing the −Z direction.

The scanning unit cover 68 includes an assisting symbol 685 for assisting the user in determining an insertion position of the medium 95 relative to the insertion port 61. The assisting symbol 685 may be formed by printing or may be formed as a concave unit or a convex unit on the top face 681 of the scanning unit cover 68. The assisting symbol 685 indicates a position that serves as a guide when the user inserts the medium 95 into the insertion port 61.

The assisting symbol 685 may be one or both of a scale, which is an example of a symbol indicating a distance from a center in the X axis direction of a scanning range of the scanning unit 63, and characters or graphics, which are examples of a symbol indicating a position where an end of the medium 95 in the X axis direction should be arranged for each standard dimension of the medium 95. Further, the scale may be provided as a symbol indicating the distance from the end in the X axis direction.

The scanning unit cover 68 includes a cover shaft 683, which is an example of a pivoting shaft extending in the +X direction and the −X direction. That is, an axis line of the cover shaft 683 extends in the X axis direction. The cover shaft 683 is positioned on the −Z direction side of the scanning unit cover 68. The cover shaft 683 may be positioned on an end of the scanning unit cover 68 on the −Z direction side. The scanning unit cover 68 is supported in a movable manner to pivot in the Z axis direction about the axis line of the cover shaft 683.

When the scanning unit cover 68 is pivoted to a closed position P1, which is an example of a first position on the +Z direction side, the fixing unit 67 is covered by the scanning unit cover 68. In the closed position P1, the conveying path of the medium 95 may be difficult to visually recognize from the outside (refer to FIG. 1). The closed position P1 is a position that allows scanning of the medium 95 by the scanning unit 63. When the scanning unit cover 68 is pivoted to an open position P2, which is an example of a second position on the −Z direction side, the fixing unit 67 is opened and the conveying path of the medium 95 is exposed to the outside (refer to FIG. 2). The open position P2 is a position where the scanning position of the medium 95 by the scanning unit 63 in the conveying path is exposed.

When the scanning unit cover 68 is closed, the top face 681 constitutes a flat face facing the +Z direction, and the front face 682 constitutes a flat face facing the +Y direction. Note that, when the scanning unit cover 68 is open, the top face 681 faces the +Y direction, and the front face 682 faces the −Z direction. In the scanning unit cover 68, a length L2 in the X axis direction, which is an example of an axial direction of the cover shaft 683, is greater than a length L1 in the Z axis direction, which is an example of a direction orthogonal to the axial direction (refer to FIG. 1).

Figure 4:
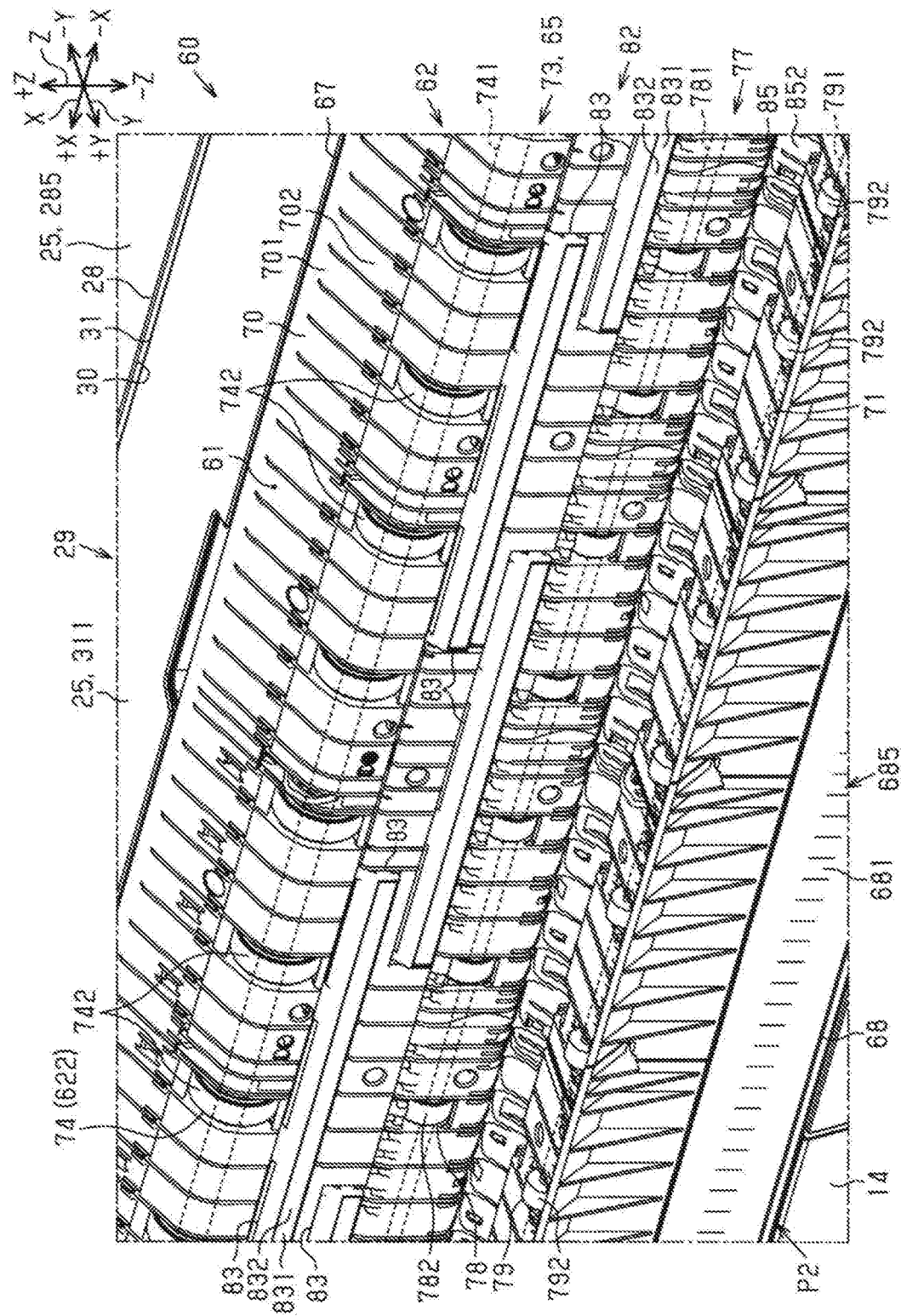
FIG. 4 is a perspective view illustrating a portion of FIG. 2, enlarged.

As illustrated in FIG. 4 and FIG. 5, the insertion port 61 is formed as a space sandwiched in the Z axis direction by a fixing-side guide face 70 of the fixing unit 67 and a cover-side guide face 71 of the scanning unit cover 68. The insertion port 61 opens in the +Z direction in the scanning function unit 60. The insertion port 61 may be configured to open at an angle relative to the +Z direction.

In one example, the insertion port 61 is provided on the top face 25 of the main body 12.

The fixing-side guide face 70 includes a first portion 701 adjacent to a +Y direction side of the viewing window 29, and a second portion 702 connected to a portion on a +Y direction side of the first portion 701. The first portion 701 constitutes a flat face extending in the X axis direction and the Y axis direction. The second portion 702 is inclined downward in the −Z direction increasingly in the +Y direction.

The cover-side guide face 71 is provided, on the scanning unit cover 68 in a position of the fixing unit 67, to face the fixing-side guide face 70 (refer to FIG. 5). The cover-side guide face 71 faces the −Z direction. The cover-side guide face 71 may also face the −Y direction. The fixing-side guide face 70 and the cover-side guide face 71 are mutually most separated on an upstream side in the conveying direction of the medium 95 in the scanning function unit 60. The fixing-side guide face 70 and the cover-side guide face 71 are brought increasingly closer to each other toward a downstream side in the conveying direction. An insertion direction D3 of the medium 95 in the insertion port 61 is a direction on the −Z direction side.

In the scanning function unit 60, the conveying unit 62 includes a first conveying mechanism 73, and a second conveying mechanism 77 further on the downstream side of the medium 95 in the conveying direction than the first conveying mechanism 73. Further, the conveying unit 62 includes a scanning drive motor 621 configured to drive the first conveying mechanism 73 and the second conveying mechanism 77 (refer to FIG. 5).

The first conveying mechanism 73 includes a first driving roller 74, a first driven roller 75, and a second driven roller 76. The first driving roller 74 is provided to or in the fixing unit 67. The first driven roller 75 and the second driven roller 76 are provided to or in the scanning unit cover 68.

When the scanning unit cover 68 is closed, the first driven roller 75 and the second driven roller 76 face the first driving roller 74. The first driven roller 75 is provided further on the upstream side of the medium 95 in the conveying direction than the second driven roller 76.

The first driving roller 74 is rotatably supported about an axis line of a first driving shaft 741 extending in the X axis direction. The first driving roller 74 of the exemplary embodiment includes a plurality of first driving rotating bodies 742 capable of rotating with the first driving shaft 741. The plurality of first driving rotating bodies 742 are aligned at a predetermined interval or at predetermined intervals in the X axis direction. The first driving roller 74 is driven by the drive motor 621.

The first driven roller 75 is rotatably supported about an axis line of a first driven shaft 751 extending in the X axis direction. The first driven roller 75 includes a plurality of first driven rotating bodies 752 capable of rotating with the first driven shaft 751. The plurality of first driven rotating bodies 752 are aligned at a predetermined interval or at predetermined intervals in the X axis direction. Note that the configuration of the first driven roller 75 is not limited to a configuration in which the plurality of first driven rotating bodies 752 are supported by the common first driven shaft 751.

The second driven roller 76 is rotatably supported about an axis line of a second driven shaft 761 extending in the X axis direction. The second driven roller 76 includes a plurality of second driven rotating bodies 762 capable of rotating with the second driven shaft 761. The plurality of second driven rotating bodies 762 are aligned at a predetermined interval or at predetermined intervals in the X axis direction. Note that the configuration of the second driven roller 76 is not limited to a configuration in which the plurality of second driven rotating bodies 762 are supported by the common second driven shaft 761.

In the first conveying mechanism 73, one first driven rotating body 752 and one second driven rotating body 762 are provided correspondingly to each of the first driving rotating bodies 742. Thus, each of the driving rotating bodies 742 is associated with a corresponding first rotating body 752 and second rotating body 762. Axis lines of the first driving roller 74, the first driven roller 75, and the second driven roller 76 are mutually substantially parallel.

The first conveying mechanism 73 is configured to be capable of holding the medium 95 with the medium 95 inserted between the first driving roller 74 and the first driven roller 75. The first driving roller 74 and the first driven roller 75 constitute a holding mechanism 65 that holds the medium 95 inserted from the scanning insertion port 61.

For example, when the medium 95 has a predetermined thickness, a separation distance between an outer peripheral face of the first driving roller 74 and an outer peripheral face of the first driven roller 75 is preferably less than the thickness of the medium 95. Further, when the medium 95 does not exist, the outer peripheral face of the first driving roller 74 and the outer peripheral face of the first driven roller 75 may come into contact. Note that, of the first driving roller 74 and the first driven roller 75, the outer peripheral face of at least the first driving roller 74 is preferably covered by an elastically deformable member, such as natural rubber or synthetic rubber.

The second conveying mechanism 77 includes a second driving roller 78 and a third driven roller 79.

The second driving roller 78 is provided to or in the fixing unit 67. The third driven roller 79 is provided to or in the scanning unit cover 68. When the scanning unit cover 68 is closed, the third driven roller 79 faces the second driving roller 78.

The second driving roller 78 is rotatably supported about an axis line of a second driving shaft 781 extending in the X axis direction. The second driving roller 78 of the exemplary embodiment includes a plurality of second driving rotating bodies 782 capable of rotating with the second driving shaft 781. The plurality of second driving rotating bodies 782 are aligned at a predetermined interval or at predetermined intervals in the X axis direction. The second driving roller 78 is driven by the drive motor 621.

The third driven roller 79 is rotatably supported about an axis line of a third driven shaft 791 extending in the X axis direction. The third driven roller 79 includes a plurality of third driven rotating bodies 792 capable of rotating with the third driven shaft 791. The plurality of third driven rotating bodies 792 are aligned at a predetermined interval or at predetermined intervals in the X axis direction. Note that the configuration of the third driven roller 79 is not limited to a configuration in which the plurality of third driven rotating bodies 792 are supported by the common third driven shaft 791.

In the exemplary embodiment, the first driving roller 74, the first driven roller 75 and the second driven roller 76 as well as the second driving roller 78 and the third driven roller 79 are each an example of a conveying roller configured to convey the medium 95 inserted from the scanning insertion port 61. In the following disclosure, the first driving roller 74 is referred to as a scanning conveying roller 622 or scanning conveying unit 622. In the description below, simple reference to "the conveying unit 622" refers to the scanning conveying unit 622. Note that the first driven roller 75, the second driven roller 76, the second driving roller 78, and the third driven roller 79 may each serve as the scanning conveying roller 622.

The axial directions of the first driving roller 74, the first driven roller 75 and the second driven roller 76 as well as the second driving roller 78 and the third driven roller 79 each extend in the X axis direction. That is, the +Y direction is a direction intersecting, and more preferably orthogonal to, the Z axis direction and the axial direction of the conveying roller 622. As described above, the axis line of the cover shaft 683 of the scanning unit cover 68 extends in the X axis direction. Thus, the axial direction of the cover shaft 683 is parallel with the axial direction of the conveying roller 622. Then, the conveying path of the medium 95 by the conveying unit 62 extends in a direction from the insertion port 61 toward the discharge port 64. In the exemplary embodiment, the conveying path of the medium 95 extends in the −Z direction.

The scanning unit 63 is provided between the first conveying mechanism 73 and the second conveying mechanism 77 in the conveying direction of the medium 95. The scanning unit 63 is provided to or in the scanning unit cover 68. When the scanning unit cover 68 is positioned in the closed position P1, the scanning unit 63 is positioned on the +Z direction side of the cover shaft 683. The scanning unit 63 faces the conveying path of the medium 95 when the scanning unit cover 68 is closed.

The scanning unit 63 of the exemplary embodiment includes a plurality of contact image sensor (CIS) modules 80. The CIS modules 80 each include a contact glass 801 that comes into contact with the medium 95, a light source such as a light-emitting diode (LED) that irradiates light on the medium 95, and a photoreceptor element such as a complementary metal-oxide semiconductor (CMOS) sensor that receives the light reflected from the medium 95.

The light source of each of the CIS modules 80 irradiates white light on the medium 95 via the contact glass 801. The CIS modules 80 each scan the light reflected from the medium 95 with or using a plurality of the photoreceptor elements that include red, blue, and green color filters.

The light source and the photoreceptor elements of each of the CIS modules 80 may be controlled by a control unit 100 described later or by a dedicated control unit such as a microprocessor provided to or with the CIS modules 80. The scanning results of the photoreceptor elements of the CIS modules 80 are synthesized by the control unit 100 described later. Color image data is generated.

In each of the CIS modules 80 of the exemplary embodiment, the photoreceptor elements are arranged in the X axis direction. The CIS modules 80 are configured to allow all of the medium 95 to be scanned at once or at the same time in a range equivalent to the dimension of the medium 95 in the X axis direction. In the scanning function unit 60, the plurality of CIS modules 80 are arranged in the X axis direction. In one example, a portion of each CIS module 80 may mutually overlapping in the Z axis direction (refer to FIG. 1). In other words, some of the CIS modules 80 may partially overlap in the Z axis direction.

The scanning function unit 60 includes a biasing unit 82 that biases the medium 95 so that the medium 95 presses against the contact glass 801 of the CIS module 80. The biasing unit 82 is provided between the first conveying mechanism 73 and the second conveying mechanism 77 in the conveying direction of the medium 95. The biasing unit 82 is provided to or in the fixing unit 67. The biasing unit 82 faces the conveying path of the medium 95 when the scanning unit cover 68 is closed.

The biasing unit 82 includes a plurality of biasing mechanisms 83 extending in or arranged in the X direction. Each of the biasing mechanisms 83 includes a biasing member 832 provided with a biasing face 831 facing the +Y direction. A member such as a spring may bias the biasing member 832 in the +Y direction. When the scanning unit cover 68 is closed, the biasing faces 831 of each of the biasing mechanisms 83 are separately provided respectively facing each of the contact glasses 801 of the CIS modules 80. That is, in the scanning function unit 60, the plurality of biasing mechanisms 83 are arranged in the X axis direction with a portion of each mutually overlapping in the Z axis direction (refer to FIG. 2).

The plurality of biasing faces 831 are examples of regions facing the scanning unit 63.

Further, the region sandwiched or positioned between the contact glasses 801 of the CIS modules 80 and the biasing faces 831 of the biasing mechanisms 83 is a scanning position 631 where the scanning unit 63 scans the medium 95. That is, the conveying unit 62 conveys the medium 95 inserted from the insertion port 61 to the scanning position 631. Further, the scanning unit 63 scans the medium 95 inserted from the insertion port 61.

As illustrated in FIG. 5, the scanning discharge port 64 is formed as a space sandwiched in the Z axis direction by a flap 85 of the fixing unit 67, and a guide roller 86 of the scanning unit cover 68.

The flap 85 is provided on the −Z direction side of the second conveying mechanism 77 on the fixing unit 67. The flap 85 is a plate-like member extending in the X axis direction. The flap 85 is configured so that a leading end on the +Y direction side is displaceable in the −Z direction about a flap shaft 851 extending in the X axis direction on the −Y direction side.

The flap 85 includes a discharge guide face 852 facing the +Z direction and/or the +Y direction. The discharge guide face 852 is inclined downward in the −Z direction increasingly in the +Y direction. Further, when a cross section cut by a plane orthogonal to the X axis direction is presumed, a cross-sectional shape of the discharge guide face 852 is an arc shape that curves into a protrusion in the −Z direction. The guide roller 86 is rotatably supported about an axis line of the guide shaft 861 extending in the X axis direction. Note that the configuration of the guide roller 86 is not limited to a configuration in which the plurality of rotating bodies constituting the guide roller 86 are supported by a common shaft.

In the scanning function unit 60, the scanning medium 95, upon insertion into the insertion port 61, is supported by being sandwiched between the first driving roller 74 and the first driven roller 75 of the first conveying mechanism 73. The medium 95 is conveyed in the −Z direction through the conveying path extending in the Z axis direction, between the fixing unit 67 and the scanning unit cover 68, by the conveying unit 62.

Between the first conveying mechanism 73 and the second conveying mechanism 77, the medium 95 is biased toward the scanning unit 63 by the biasing unit 82. That is, each of the biasing mechanisms 83 constituting the biasing unit 82 presses the medium 95 against the contact glasses 801 of the CIS modules 80 on the opposite side, sandwiching the medium 95.

The scanning unit 63 scans the medium 95 conveyed in a state where the medium 95 is pressed against the contact glasses 801. The medium 95 scanned by the scanning unit 63 is discharged from the discharge port 64. The conveying direction of the medium 95 when the medium 95 is passing through the second conveying mechanism 77 is the −Z direction. Then (after being scanned, for example), the medium 95 comes into contact with the discharge guide face 852 of the flap 85 while receiving propulsion by the driving of the conveying unit 62, and advances along the discharge guide face 852.

As a result, a discharge direction D2 of the medium 95 in the discharge port 64 is an extension direction of the discharge guide face 852 at the leading end of the flap 85. That is, the discharge direction D2 of the medium 95 in the discharge port 64 is in a direction on the +Y direction side. The flap 85 of the exemplary embodiment is an example of a regulating unit that regulates the discharge direction D2 of the medium 95.

Note that the advancing direction of the medium 95 is affected by gravity after discharge from the discharge port 64, and may come close to the −Z direction and no longer coincide with the discharge direction D2. The discharge direction D2 in this specification refers to the direction when the medium 95 is discharged from the discharge port 64. That is, the discharge direction D2 does not refer to the advancing direction of the medium 95 after discharge from the discharge port 64.

As illustrated in FIG. 1 and FIG. 2, in the exemplary embodiment, the scanning function unit 60 constitutes a portion of the main body 12. Thus, the scanning unit cover 68 of the scanning function unit 60 constitutes the housing 14 of the main body 12, with the exterior casing 28, the viewing hole cover 31 and the accommodating unit cover 40.

That is, the housing 14 includes the scanning insertion port 61 and the scanning discharge port 64. In the housing 14, the top face 25 facing the +Z direction may be regarded as including the insertion port 61. Further, the scanning function unit 60 is provided to an end of the main body 12 on the +Y direction side. That is, the insertion port 61 and the discharge port 64 are provided on the +Y direction side of the housing 14. Then, the front face 23, which is an example of the second face, includes the printing discharge port 55.

Further, the accommodating unit 35 is provided to an end of the main body 12 on the −Y direction side. That is, the housing 14 includes the accommodating unit 35 and the accommodating unit cover 40. Then, the accommodating unit 35 is provided on the −Y direction side of the housing 14.

In this specification, "provided on the +Y direction side of the housing 14" means positioned on the +Y direction side of the center in the Y axis direction of the housing 14. Similarly, in this specification, "provided on the −Y direction side of the housing 14" means positioned on the −Y direction side of the center in the Y axis direction of the housing 14.

The front face 23 of the main body 12 is configured to include the front face 283 of the exterior casing 28, and the front face 682 of the scanning unit cover 68. That is, when the scanning unit cover 68 is positioned in the closed position P1, the front face 682 of the scanning unit cover 68 is included in the front face 23. The left-side face 21 of the main body 12 is configured to include the left side face 281 of the exterior casing 28, and the right-side face 22 of the main body 12 is configured to include the right-side face 282 of the exterior casing 28. The bottom face 26 of the main body 12 is configured to include the bottom face 286 of the exterior casing 28.

Further, the top face 25 of the main body 12 is configured to include the top face 285 of the exterior casing 28, the top face 311 of the viewing hole cover 31, the top face 681 of the scanning unit cover 68, the outer surface 412 of the first accommodating unit cover 41, and the outer surface 422 of the second accommodating unit cover 42. That is, the outer surfaces 412, 422 of the accommodating unit cover 40 are included in the top face 25.

In the scanner apparatus 11 of the exemplary embodiment, the top face 285 of the exterior casing 28, the top face 311 of the viewing hole cover 31, and the top face 681 of the scanning unit cover 68 may be included in the same plane orthogonal to the Z axis direction. Further, in the main body 12, the outer surface 422 of the second accommodating unit cover 42, and the outer surface 412 of the first accommodating unit cover 41 form a surface connected in the −Y direction with the top face 285 of the exterior casing 28.

In the exemplary embodiment, when the viewing hole cover 31, the scanning unit cover 68, the second accommodating unit cover 42, and the first accommodating unit cover 41 are closed, the top face 285 of the exterior casing 28, the top face 311 of the viewing hole cover 31, the top face 681 of the scanning unit cover 68, the outer surface 422 of the second accommodating unit cover 42, and the outer surface 412 of the first accommodating unit cover 41 constitute the placement face 15. That is, the accommodating unit cover 40 of the accommodating unit 35 constitutes a portion of the placement face 15. Further, the scanning unit cover 68 constitutes a portion of the placement face 15.

A portion of the placement face 15 constituted by the top face 285 of the exterior casing 28, the top face 311 of the viewing hole cover 31, and the top face 681 of the scanning unit cover 68 is a first placement face 151, which is horizontal. A portion of the placement face 15 constituted by the outer surface 422 of the second accommodating unit cover 42, and the outer surface 412 of the first accommodating unit cover 41 is a second placement face 152. The second placement face 152 includes the outer surface 422 of the second accommodating unit cover 42, and thus at least a portion of the second placement face 152 is inclined.

The placement face 15 is a smooth surface, excluding gaps where the top face 285 of the exterior casing 28, the top face 311 of the viewing hole cover 31, and the top face 681 of the scanning unit cover 68 are adjacent to each other. Then, in the housing 14, the placement face 15 extends in the −Y direction, which is a direction opposite to the +Y direction, from the scanning insertion port 61. That is, the placement face 15 is a portion of the top face 25 of the main body 12. Then, the scanning discharge port 64 may be regarded as positioned on the −Z direction side of the placement face 15 and the scanning insertion port 61 of the housing 14.

The holding mechanism 65 and the assisting symbol 685 are provided to or in the scanning function unit 60 on the +Y direction side of the main body 12. That is, the housing 14 includes the assisting symbol 685. Then, the holding mechanism 65 and the assisting symbol 685 are provided on the +Y direction side of the housing 14.

Next, an electrical configuration of the scanner apparatus 11 will be described.

Figure 6:
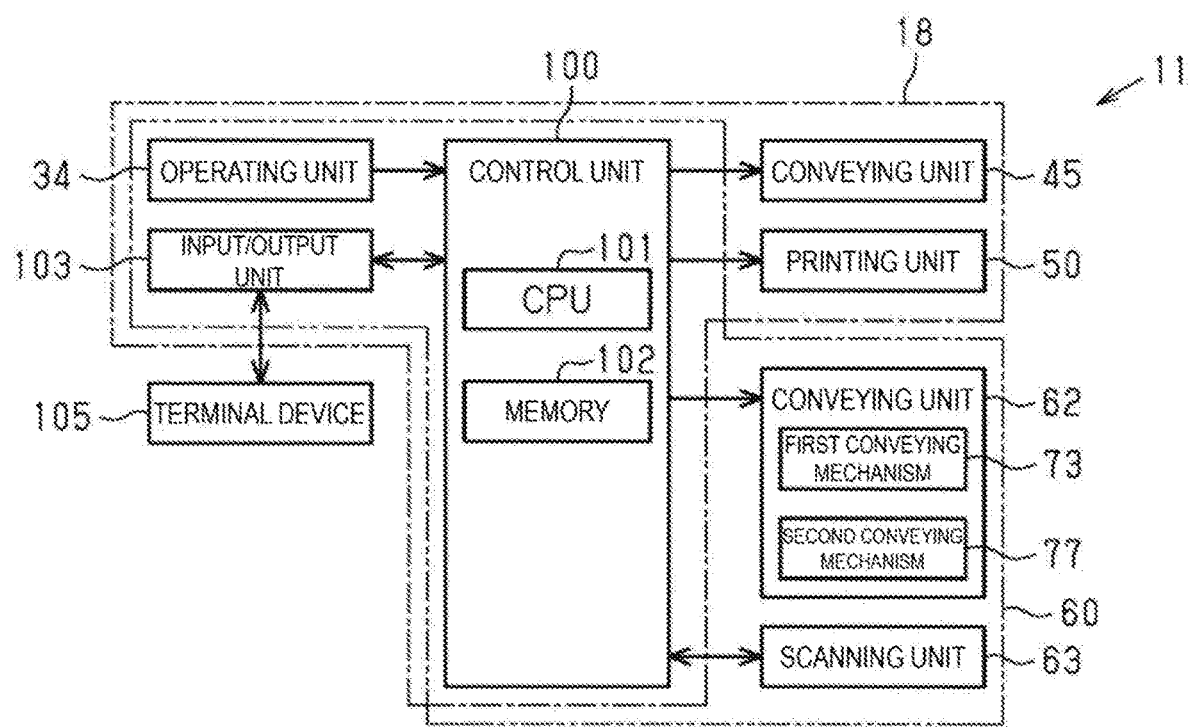
FIG. 6 is a block diagram illustrating an example electrical configuration of the scanner apparatus.

As illustrated in FIG. 1 and FIG. 6, the scanner apparatus 11 includes the control unit 100. The control unit 100 includes a central processing unit (CPU) 101 and a memory 102, which may include random access memory (RAM), read-only memory (ROM), and/or the like. Various programs for controlling the scanner apparatus 11 are stored in the memory 102. The control unit 100 may be configured to include dedicated hardware (an application-specific integrated circuit (ASIC)) that executes at least a portion of the various processing. That is, the control unit 100 may be configured to include one or more processors that run in accordance with a computer program (software), one or more dedicated hardware such as an ASIC, or a combination of these. The processor includes a CPU and memory such as RAM and ROM. The memory stores program codes or commands configured to execute processing on the CPU or configured to be executed by the CPU. The memory, which is an example of a computer readable medium, includes various memory that can be accessed by a general-purpose or dedicated computer.

The control unit 100 is connected to the operation unit 34. The control unit 100 allows entry of operation signals output when the operation unit 34 is operated. When a copy request signal is output when a predetermined operation is performed using the operation unit 34, the control unit 100 receives a copy request. The copy request serves as a trigger for activating the scanner apparatus 11, causing the scanner apparatus 11 to scan the medium 95 using the scanning function unit 60 and generate image data, and/or print the generated image data on the printing medium 90 to make a copy.

The control unit 100 is connected in a manner that allows bidirectional communication with an input/output unit 103. The input/output unit 103 is configured to be connectable with a terminal device 105, such as a notebook personal computer or other computing device. Note that the input/output unit 103 may be configured to allow wired connection, or may be configured to allow wireless connection. The control unit 100 allows input of a print request signal and a scan request signal output by the terminal device 105 connected to the input/output unit 103. Thus, the control unit 100 is able to receive input from the terminal device 105 through the input/output unit 103.

When a print request signal is input or received from the terminal device 105, the control unit 100 receives a print request. The print request serves as a trigger for activating the scanner apparatus 11, causing the scanner apparatus 11 to print image data, such as images and characters, input or received from the terminal device 105 onto the printing medium 90. The print request signal is caused to be output by the user operating the terminal device 105 in one example.

When a scan request signal is input or received from the terminal device 105, the control unit 100 receives a scan request. The scan request serves as a trigger for activating the scanner apparatus 11. The trigger causes the scanner apparatus 11 to scan the scanning medium 95 to generate image data, and output the generated image data from the input/output unit 103 to the terminal device 105. The scan request signal is caused to be output by the user operating the terminal device 105.

The control unit 100 is electrically connected with the conveying unit 45 and the printing unit 50 of the printing function unit 18. The control unit 100 activates the printing function unit 18 of the scanner apparatus 11 by controlling the conveying unit 45 and the printing unit 50. The control unit 100 is electrically connected with the conveying unit 62 and the scanning unit 63 of the scanning function unit 60. The control unit 100 activates the scanning function unit 60 of the scanner apparatus 11 by controlling the conveying unit 62 and the scanning unit 63. The control unit 100 controls the first conveying mechanism 73 and the second conveying mechanism 77.

The control contents of the control unit 100 will now be described.

The control unit 100 controls the scanning function unit 60 so that a scanning operation of scanning the medium 95 is performed when a copy request is received. In the following, the processing that causes the scanning function unit 60 to perform a scanning operation is expressed as scan control processing.

In scan control processing, the control unit 100 controls the drive motor 621 of the conveying unit 62 so that the medium 95 inserted into the insertion port 61 is conveyed along the scanning conveying path. When the medium 95 passes the scanning position 631, the control unit 100 controls the scanning unit 63 so that the images, characters, and the like recorded on the medium 95 are scanned.

The control unit 100 controls the light source of each of the CIS modules 80 so that white light is irradiated on the medium 95. The control unit 100 inputs the results detected by the plurality of photoreceptor elements via the red, blue, and green filters. The control unit 100 synthesizes the detection results from the photoreceptor elements of the plurality of CIS modules 80, and thus generates color image data corresponding to characters and images recorded on the medium 95. Note that the control unit 100 stores the generated color image data in the memory 102. Subsequently, the control unit 100 terminates the scan control processing.

The control unit 100 controls the printing function unit 18 so that a print operation of printing on the printing medium 90 is performed. In the following, the processing that causes the printing function unit 18 to perform a printing operation is expressed as print control processing.

In print control processing, the control unit 100 controls the conveying motor of the conveying unit 45 so that the medium 90 accommodated in the accommodating unit 35 is conveyed along the printing conveying path. When the medium 90 passes the printing position by the printing unit 50, the control unit 100 controls the printing motor and the liquid discharge head 54 of the printing unit 50 so that liquid is discharged onto the medium 90. The control unit 100 controls the printing unit 50 so that image data to be printed is printed. In one example, the image data to be printed when a copy request is received is image data generated upon scanning the medium 95. When the printing of the image data to be printed is completed, the control unit 100 ends print control processing.

When a print request is received, the control unit 100 executes print control processing. The image data to be printed when a print request is received may be image data input from the terminal device 105. Further, when a scan request is received, the control unit 100 executes scan control processing. When a scan request is received, the control unit 100, upon completion of scan control processing, outputs image data, scanned and generated from the medium 95, from the input/output unit 103 to the terminal device 105.

Next, the action or operation of the exemplary embodiment will be described.

In this description, it is presumed that the scanner apparatus is configured so that the insertion port 61 and the discharge port 64 are provided on the +Y direction side of the housing 14, and the conveying path of the medium 95 in the interior of the housing 14 is looped back in a U shape. According to such a configuration, the user can handle the portion of the medium 95 on a first end 951 side discharged from the discharge port 64, and the portion of the medium 95 on a second end 952 side before insertion into the insertion port 61 from the same +Y direction side.

On the other hand, in the scanner apparatus presumed above, the portion on the first end 951 side discharged from the discharge port 64 and the portion on the second end 952 side before insertion into the insertion port 61 may mutually interfere. In other words in the scanner apparatus presumed above, the portion on the first end 951 side discharged from the discharge port 64 may be once again inserted into the insertion port 61—affecting conveyance of the medium 95. Such problems are significant when the medium 95 develops a tendency to curl when passing through the U-shaped conveying path.

Thus, in the scanner apparatus presumed above, to ensure that the portion of the medium 95 on the first end 951 side discharged from the discharge port 64 does not interfere with the portion of the medium 95 on the second end 952 side before insertion into the insertion port 61, a support unit that supports the medium 95 needs to be provided, or the user needs to support the medium 95. When a support unit of the medium 95 is provided, the scanner apparatus increases in size. Further, when the user supports the medium 95, user convenience is lessened.

Figure 7:
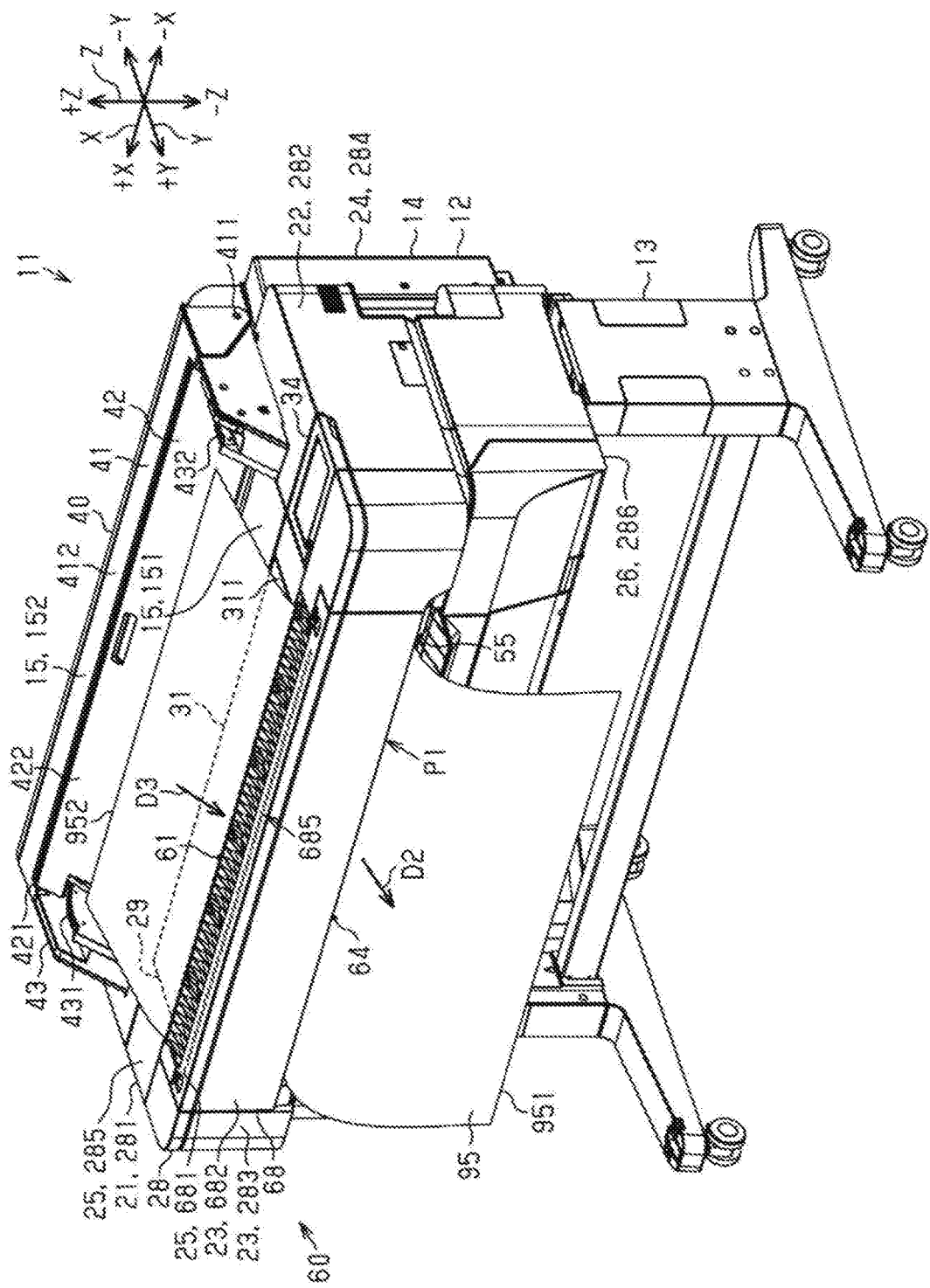
FIG. 7 is a perspective view illustrating an example of a state of use of the scanner apparatus.

As illustrated in FIG. 7, in the scanner apparatus 11 of the exemplary embodiment, the scanning insertion port 61 is provided on the +Y direction side of the housing 14. Thus, the user can easily insert the medium 95 into the insertion port 61 from the +Y direction side. In the scanner apparatus 11, the scanning discharge port 64 is provided on the +Y direction side of the housing 14. As a result, the user can easily handle the medium 95 discharged in the discharge port 64 from the +Y direction side.

For example, when it is presumed that the discharge direction D2 of the medium 95 is a direction on the −Y direction side, the medium 95 is discharged in a direction away from the user who is on the +Y direction side of the scanner apparatus 11. That is, the user needs to go around to the −Y direction side of the scanner apparatus 11 to collect the medium 95 discharged from the discharge port 64.

In contrast, in the exemplary embodiment, the discharge direction D2 of the medium 95 in the discharge port 64 is in a direction on the +Y direction side. As a result, the user can easily handle the medium 95 discharged in or from the discharge port 64 from the +Y direction side.

Thus, with the scanner apparatus 11, the user can perform the task of inserting the medium 95 into the insertion port 61 and handle the medium 95 discharged from the discharge port 64 from the same +Y direction side.

Then, the housing 14 includes the placement face 15 extending in the −Y direction from the insertion port 61. As a result, when the first end 951 of the medium 95 is inserted into the insertion port 61, the placement face 15 can support the portion of the medium 95 on the second end 952 side, which is the side opposite to the first end 951. That is, when the first end 951 of the medium 95 is inserted into the insertion port 61, the user can place the second end 952 side of the medium 95 on the placement face 15.

Thus, in the scanner apparatus 11, the portion on the second end 952 side is placed on the placement face 15 to extend in the −Y direction while the portion on the first end 951 side is discharged in a direction on the +Y direction side. That is, of the medium 95, the portion on the first end 951 side already scanned, and the portion on the second end 952 side not yet scanned are not likely to mutually come into contact. Thus, in the scanner apparatus 11 of the exemplary embodiment, mutual interference between the first end 951 side and the second end 952 side of the medium 95 is suppressed without providing a support unit that supports the second end 952 side of the medium 95 and is required in the scanner apparatus presumed above having a configuration in which the conveying path is looped back in a U-shape. The apparatus 11 is configured such that the first end 951 side will not be fed inadvertently back into the insertion port 61. In effect, the placement face 15 allows portions of the housing to provide support for portions of the medium 95 not yet scanned.

Further, in the scanner apparatus 11, the conveying path of the medium 95 by the conveying unit 62 extends in a direction from the insertion port 61 toward the discharge port 64. As a result, a length occupied by the constituent elements for scanning the medium 95 in the Z axis direction above the placement face 15 of the housing 14 is small compared to when a configuration is adopted in which the conveying path of the medium 95 is looped back in a U shape. Thus, even when the constituent elements for scanning the medium are configured to be disposed on the +Y direction side of the accommodating unit 35, user access to the accommodating unit 35 from the +Y direction side of the scanner apparatus 11 is less likely to be impeded.

Further, in the exemplary embodiment, the viewing window 29 is provided on the −Y direction side of the constituent elements for scanning the medium 95. Accordingly, when a length, in the Z axis direction above the placement face 15 of the housing 14, occupied by the constituent elements for scanning the medium 95 is large and the distance in the Y axis direction between the constituent elements and the viewing window 29 is short, visual recognition of the interior of the main body 12 via the viewing window 29 by the user standing on the +Y direction side of the scanner apparatus 11 is readily impeded. Thus, in a configuration in which the conveying path of the medium 95 is looped back in a U shape, the distance in the Y axis direction between the viewing window 29 and the constituent elements for scanning the medium 95 needs to be sufficiently lengthened.

In contrast, in the exemplary embodiment, the length occupied in the Z axis direction by the constituent elements for scanning the medium 95 is relatively small, making it possible to decrease the distance from the end of the housing 14 on the +Y direction side to the accommodating unit 35. Thus, the user can easily access the accommodating unit 35 from the +Y direction side of the housing 14. Then, as described above, the accommodating unit cover 40 of the exemplary embodiment constitutes a portion of the placement face 15, making it possible to achieve the placement face 15 having a wide surface area.

In particular, in the scanner apparatus 11, the discharge port 64 is positioned on the −Z direction side of the placement face 15 and the insertion port 61 of the housing 14. As a result, the conveying path of the medium 95 includes a component in the −Z direction. Thus, the length of the conveying path of the medium 95 in the Y axis direction can be decreased.

That is, the scanning function unit 60 is configured to allow a decrease in the length in the Y axis direction, particularly comparted to apparatus that require a U shaped path.

As a result, in the housing 14, the scanning insertion port 61 can be brought closer to the +Y direction side, thereby advantageously decreasing (or at least preventing from increasing) dimensions of the apparatus 11 relative to other apparatuses. Thus, the medium 95 can be easily inserted into the scanning insertion port 61. Further, a placement face 15 having a wider surface area can be achieved without increasing the length of the housing 14 in the Y axis direction.

Further, in the scanning function unit 60, the insertion port 61 and the discharge port 64 may be aligned in the Z axis direction, and the conveying path of the medium 95 is a planar space also extending in the Z axis direction. Thus, excluding a slight curve by the conveying unit 62, the medium 95 is not significantly bent or curved after being inserted into the insertion port 61 to being discharged in the discharge port 64. Thus, the medium 95 can be kept from developing a tendency to curl.

When the accommodating unit cover 40 is closed, the outer surface 412 of the first accommodating unit cover 41 is a horizontal face, and the outer surface 422 of the second accommodating unit cover 42 is an inclined face extending upward in the +Z direction increasingly in the −Y direction. Thus, a volume of the accommodating space 36 can be maintained. As part of the placement face 15, the second placement face 152 can be continuous with the first placement face 151 and thus, together, formed as at least part of the placement face 15.

In the scanner apparatus 11, the printing discharge port 55 is provided on the +Y direction side of the housing 14. Further, the discharge direction D1 of the medium 90 in the discharge port 55 is in a direction on the +Y direction side, similar to the discharge direction D2 of the medium 95 in the discharge port 64. As a result, the user can handle the medium 95 scanned by the scanning unit 63 and the medium 90 printed by the printing unit 50 from the same +Y direction side of the housing 14.

The scanner apparatus 11 includes the holding mechanism 65 that holds the medium 95 inserted from the insertion port 61 (refer to FIG. 5). As a result, even when the user positions and inserts the medium 95 into the insertion port 61, unintended deviation of the position of the medium 95 can be suppressed until conveyance of the medium 95 is started. Further, the holding mechanism 65 is provided on the +Y direction side of the housing 14, and thus the user can easily make the holding mechanism 65 hold the medium 95.

Further, the scanner apparatus 11 includes the assisting symbol 685 indicating a position that serves as a guide when the user inserts the medium 95 into the insertion port 61. Thus, the user can insert the medium 95 into the insertion port 61 in an appropriate position with the aid of the assisting symbol 685.

Then, the holding mechanism 65 and the assisting symbol 685 are provided on the +Y direction side of the housing 14, in the same manner as the insertion port 61 and the discharge port 64. Thus, the task of inserting the medium 95 into the insertion port 61 is easy.

Figure 8:
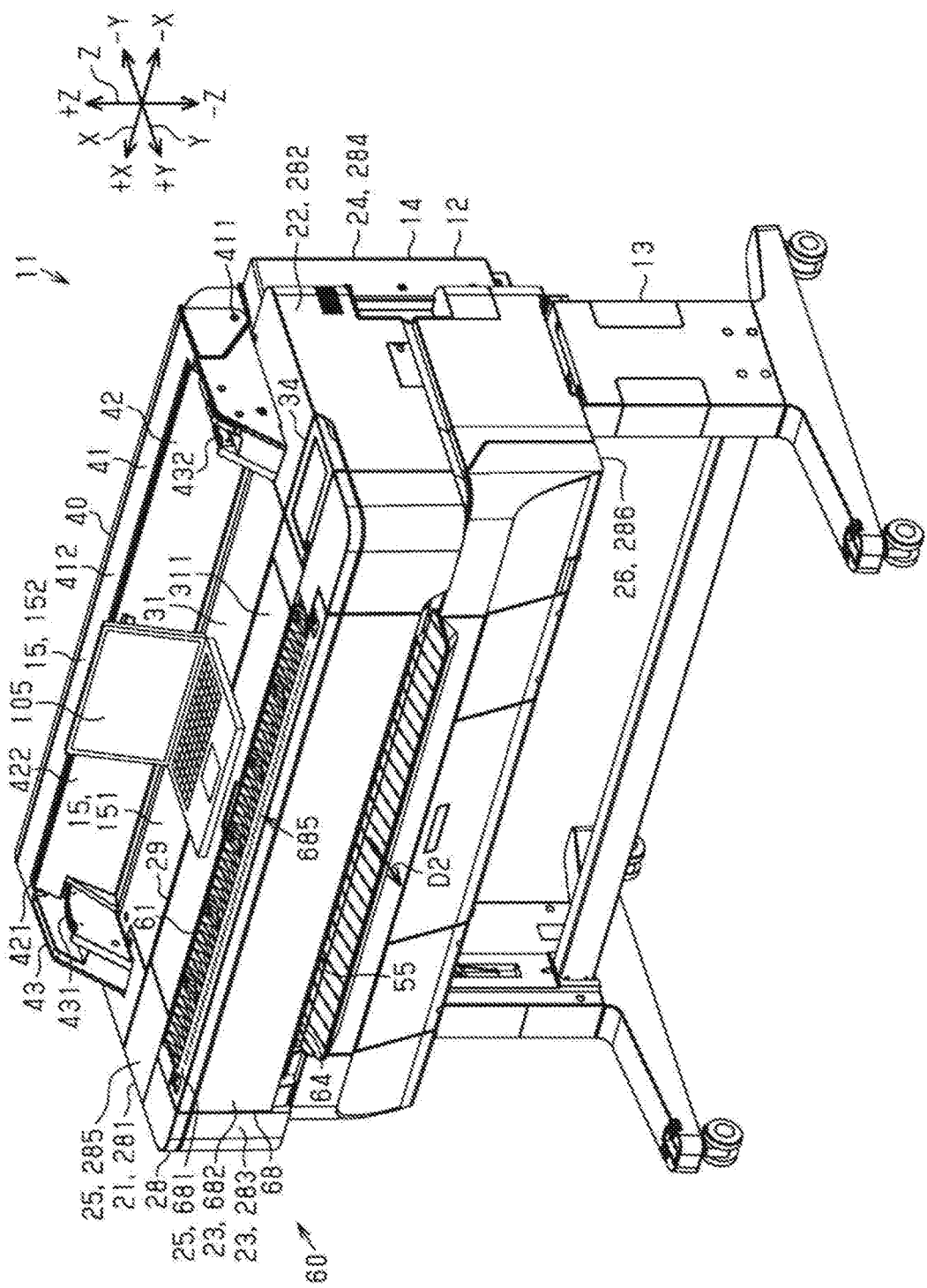
FIG. 8 is a perspective view illustrating an example of a state of use of the scanner apparatus.

Further, as illustrated in FIG. 7 and FIG. 8, the existence of the portion of the placement face 15 on the +Z direction side of the scanner apparatus 11 is useful for placing the medium 95 (refer to FIG. 7) and for placing an object such as a terminal device 105 (refer to FIG. 8). When a print request for image data created using the terminal device 105 is made, or when image data, which is as an example of a scanning result of the scanner apparatus 11, is to be checked, the placement face 15 is convenient in allowing placement of the terminal device 105.

In the description below, the scanner apparatus is presumed to be configured so that the scanning function unit 60 is provided in a center in the Y axis direction of the portion of the main body 12 on the +Z direction side, and the scanning unit cover is opened in the +Z direction, making it possible to expose the conveying path of the medium 95 and the scanning position by the scanning unit.

In such a scanner apparatus as well, when the scanning unit cover is closed, the surface of the scanning unit cover on the +Z direction side can presumably serve as the placement face. Nevertheless, in the scanner apparatus presumed above, when the scanning unit cover is opened in the +Z direction, it is difficult to utilize the placement face as a space for placing an object to be placed.

Further, in the portion of the main body 12 on the +Z direction side, the placement face can also conceivably be provided in alignment in the Y axis direction with the scanning unit cover. Nevertheless, the scanning unit cover is preferably long enough to cover the front and rear of the scanning unit in the conveying path of the medium 95 to keep light from entering the scanning unit from outside the scanner apparatus. As a result, in the scanner apparatus presumed above, it is difficult to increase the surface area of the placement face.

According to the scanner apparatus 11 of the exemplary embodiment, the scanning position 631 by the scanning unit 63 can be exposed by moving the scanning unit cover 68 from the closed position P1 to the open position P2. As a result, maintenance of the scanning unit 63 and processing such as elimination of a jam of the medium 95 are easy.

Then, the front face 682 of the scanning unit cover 68 constitutes the front face 23 extending in a direction intersecting the top face 25 in the main body 12. That is, the scanning unit cover 68 constitutes an end of the scanner apparatus 11 on the +Y direction side. Accordingly, the surface area of the top face 25 applicable as the placement face 15 can be increased. Accordingly, user convenience can be enhanced.

Even when the scanning unit cover 68 is moved to the open position P2, the top face 285 of the exterior casing 28 and the top face 311 of the viewing hole cover 31 of the first placement face 151 are maintained on a horizontal plane. As a result, even within the first placement face 151, the top face 285 of the exterior casing 28 and the top face 311 of the viewing hole cover 31 can be utilized as a space for placing an object to be placed regardless of the opening/closing of the scanning unit cover 68. That is, it is possible to move the scanning unit cover 68 to the open position P2 and perform maintenance and the like on the scanning unit 63 while leaving the object to be placed on the first placement face 151. Further, as long as the scanning unit cover 68 is moved to the closed position P1, the first placement face 151 can be utilized in its entirety, including the top face 681 of the scanning unit cover 68, as a space for placing an object to be placed.

As described above, the scanning function unit 60 of the scanner apparatus 11 is configured so that the length in the Y axis direction is decreased (e.g., compared to the apparatus presumed above). Thus, a ratio occupied by the top face 681 of the scanning unit cover 68 within the first placement face 151 can be decreased. That is, in the exemplary embodiment, the top face 285 of the exterior casing 28 and the top face 311 of the viewing hole cover 31 can be widened. Further, when the object to be placed has a shape that readily rolls such as the medium roll 91 accommodated by the accommodating unit 35, it is easy to place the object to be placed in the region of the first placement face 151, excluding the top face 681, and a degree of freedom of the shape of the scanning unit cover 68 is increased. Further, the second placement face 152 can be utilized as a space for placing an object to be placed regardless of the opening/closing of the scanning unit cover 68, even though at least a portion of the second placement face 152 includes a portion that is not horizontal.

Further, in the scanner apparatus presumed above, when the user who is on the +Y direction side of the scanner apparatus opens the scanning unit cover in the +Z direction, the scanning unit cover rises in the portion of the scanner apparatus on the +Z direction side, possibly impeding access to the accommodating unit 35. That is, the scanning unit cover 68 interferes with access to the accommodating unit 35.

In contrast, in the scanner apparatus 11 of the exemplary embodiment, the scanning unit cover 68 is included in the front face 23 extending in a direction intersecting the top face 25, and the outer surfaces 412, 422 of the accommodating unit cover 40 are included in the top face 25 of the main body 12. Accordingly, even when the scanning unit cover 68 is moved to the open position P2, the scanning unit cover 68 is kept from interfering with access to the accommodating unit cover 40.

In particular, in the exemplary embodiment, the open position P2 of the scanning unit cover 68 is a position pivoted to the −Z direction side. Thus, when the scanning unit cover 68 is open, the scanning unit cover 68 does not impede access to the accommodating unit cover 40.

Some of the effects of the exemplary embodiment will now be described.

(1) In the scanner apparatus 11, the task of inserting the medium 95 into the insertion port 61 and handling the medium 95 discharged from the discharge port 64 can be performed from the same +Y direction side. Accordingly, user convenience can be enhanced. Further, when the first end 951 of the medium 95 is inserted into the insertion port 61, the user can place the second end 952 side on the placement face 15. As a result, mutual interference between the first end 951 side and the second end 952 side of the medium 95 can be suppressed without providing a support unit that supports the second end 952 side of the medium. Accordingly, an increase in size of the scanner apparatus 11 can be suppressed.

(2) The scanning function unit 60 is configured to allow a decrease in the length in the Y axis direction. As a result, it is possible to decrease the distance from the end of the housing 14 on the +Y direction side to the accommodating unit 35. Thus, the accommodating unit 35 can be readily accessed from the +Y direction side of the housing 14. Then, the accommodating unit cover 40 constitutes a portion of the placement face 15, and thus the placement face 15 having a wide surface area is achieved.

(3) The conveying path of the medium 95 by the conveying unit 62 includes a component in the −Z direction. As a result, the length of the scanning function unit 60 in the Y axis direction can be further decreased. That is, in the housing 14, the insertion port 61 can be brought closer to the +Y direction side. Accordingly, the medium 95 can be easily inserted into the insertion port 61.

(4) The discharge direction D2 of the medium 95 in the discharge port 64 and the discharge direction D1 of the medium 90 in the discharge port 55 are both directions on the +Y direction side. As a result, both the medium 95 and the medium 90 can be handled from the same +Y direction side of the housing 14.

(5) The holding mechanism 65 and the assisting symbol 685 are provided on the +Y direction side of the housing 14, in the same manner as the insertion port 61 and the discharge port 64. Thus, the task of inserting the medium 95 into the insertion port 61 is easy.

(6) The scanning position 631 can be exposed by moving the scanning unit cover 68 from the closed position P1 to the open position P2. As a result, maintenance of the scanning unit 63 and processing such as elimination of a jam of the medium 95 are easily resolved. Then, the front face 682 of the scanning unit cover 68 constitutes the front face 23 of the main body 12. That is, the scanning unit cover 68 constitutes an end of the scanner apparatus 11 in the +Y direction. Thus, the surface area of the portion applicable as the placement face 15 can be increased. Accordingly, user convenience can be enhanced.

(7) The front face 682 of the scanning unit cover 68 is included in the front face 23 of the main body 12 and thus, even when the scanning unit cover 68 is moved to the open position P2, the scanning unit cover 68 is kept from interfering with access to the accommodating unit cover 40.

(8) The scanning unit cover 68 pivots to the closed position P1 and the open position P2 about the cover shaft 683. As a result, the scanning unit cover 68 can be easily moved compared to a configuration in which the scanning unit cover 68 is moved by being slid.

(9) In the scanning unit cover 68, the length L2 in the axial direction of the cover shaft 683 is greater than the length L1 in a direction orthogonal to the axial direction of the cover shaft 683. As a result, a space required when pivoting the scanning unit cover 68 can be decreased compared to when the length L2 is less than the length L1.

(10) The scanning unit cover 68 pivots about the cover shaft 683 on the −Z direction side of the scanning unit 63. That is, the scanning unit cover 68 pivots in the gravity direction. As a result, a special mechanism does not need to be provided to maintain the scanning unit cover 68 in the open position P2.

(11) The printing discharge port 55 is provided on the front face 23 in which the outer surface of the scanning unit cover 68 is included. As a result, the user can handle the scanning unit cover 68 and the medium 90 printed by the printing unit 50 from the same +Y direction side.

(12) The user can visually recognize the medium 90 immediately after printing by the printing unit 50 through the viewing window 29. Thus, the user can easily verify whether or not printing by the printing unit 50 is being performed normally while utilizing the placement face 15 that includes the top face 311 of the viewing hole cover 31.

(13) A portion of the first placement face 151 on the −Y direction side and the second placement face 152 are sandwiched in the X axis direction by the left cover support unit 431 and the right cover support unit 432. Accordingly, the portion of the medium 95 on the second end 952 side is kept from deviating in the X axis direction. That is, the left cover support unit 431 and the right cover support unit 432 may each be regarded as an example of a medium guide that guides the medium 95.

The exemplary embodiment described above may be modified as follows. The exemplary embodiment and the modified examples below may be implemented in combination within a range in which a technical contradiction does not arise. Note that, in the descriptions below, constituent elements having the same function as constituent elements mentioned above are denoted using the same reference numerals, and duplicate descriptions are omitted.

Figure 9:
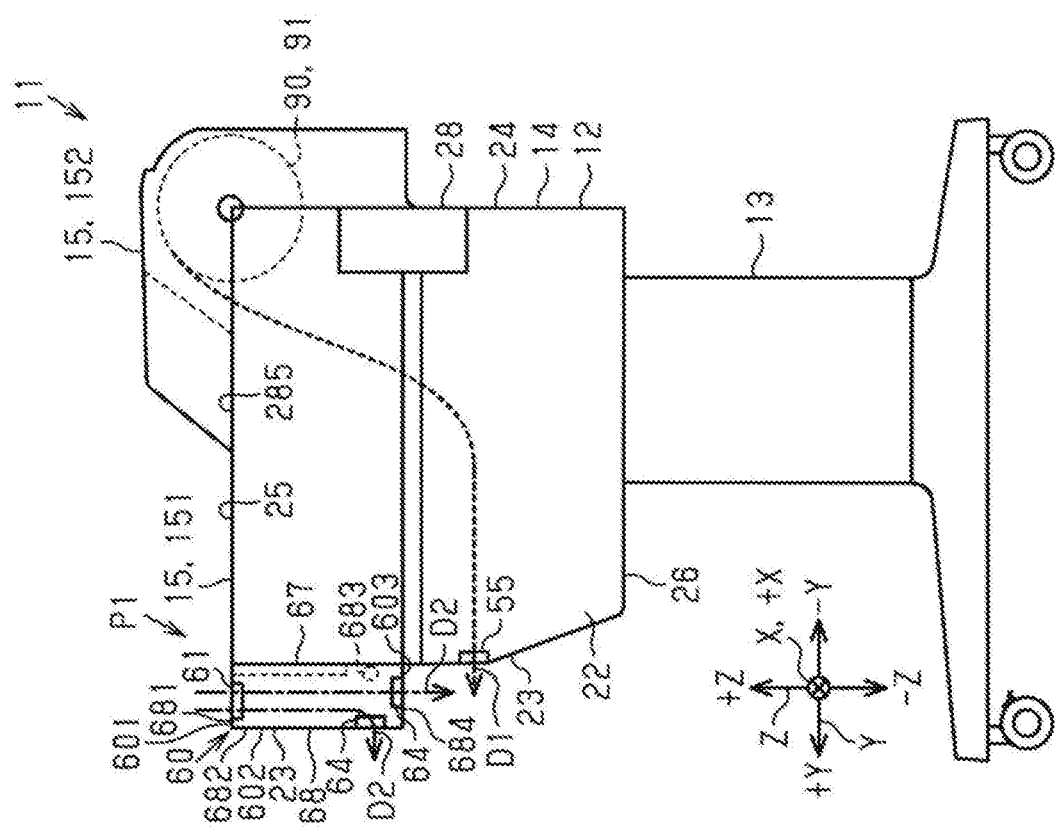
FIG. 9 is a schematic view illustrating a first modified example of the scanner apparatus.

As illustrated in FIG. 9, in the scanner apparatus 11 of the exemplary embodiment, the scanning function unit 60 extends in the Z axis direction at the end of the main body 12 on the +Y direction side. That is, the scanning function unit 60 has an I shape when viewed from the X axis direction. The scanning function unit 60 includes the insertion port 61 on a top face 601 facing the +Z direction, and includes the discharge port 64 on a front face 602 facing the +Y direction. The discharge direction D2 of the medium 95 is a direction on the +Y direction side. Note that the top face 601 of the scanning function unit 60 is the top face 681 of the scanning unit cover 68. The front face 602 of the scanning function unit 60 is the front face 682 of the scanning unit cover 68.

The opening directions and positions of the insertion port 61 and the discharge port 64, and the discharge direction D2 of the medium 95 are not limited to those in the exemplary embodiment described above, and may be changed to a configuration such as described below.

FIG. 9 schematically illustrates the scanner apparatus 11 of a first modified example, in addition to the scanner apparatus 11 of the exemplary embodiment. In the scanner apparatus 11 of the first modified example, the scanning function unit 60 extends in the Z axis direction at the end of the main body 12 on the +Y direction side. That is, the scanning function unit 60 has an I shape when viewed from the X axis direction.

The scanning function unit 60 includes the insertion port 61 on the top face 601 facing the +Z direction, and includes the discharge port 64 on a bottom face 603 facing the −Z direction. In the first modified example, the discharge direction D2 of the medium 95 is the −Z direction. The bottom face 603 of the scanning function unit 60 is the bottom face 684 of the scanning unit cover 68. Note that the scanner apparatus 11 of the first modified example does not include the discharge port 64 on the front face 602. In the exemplary embodiment and the first modified example, the discharge port 64 may be provided to the front face 602, facing the +Y direction, of the scanning function unit 60.

Figure 10:
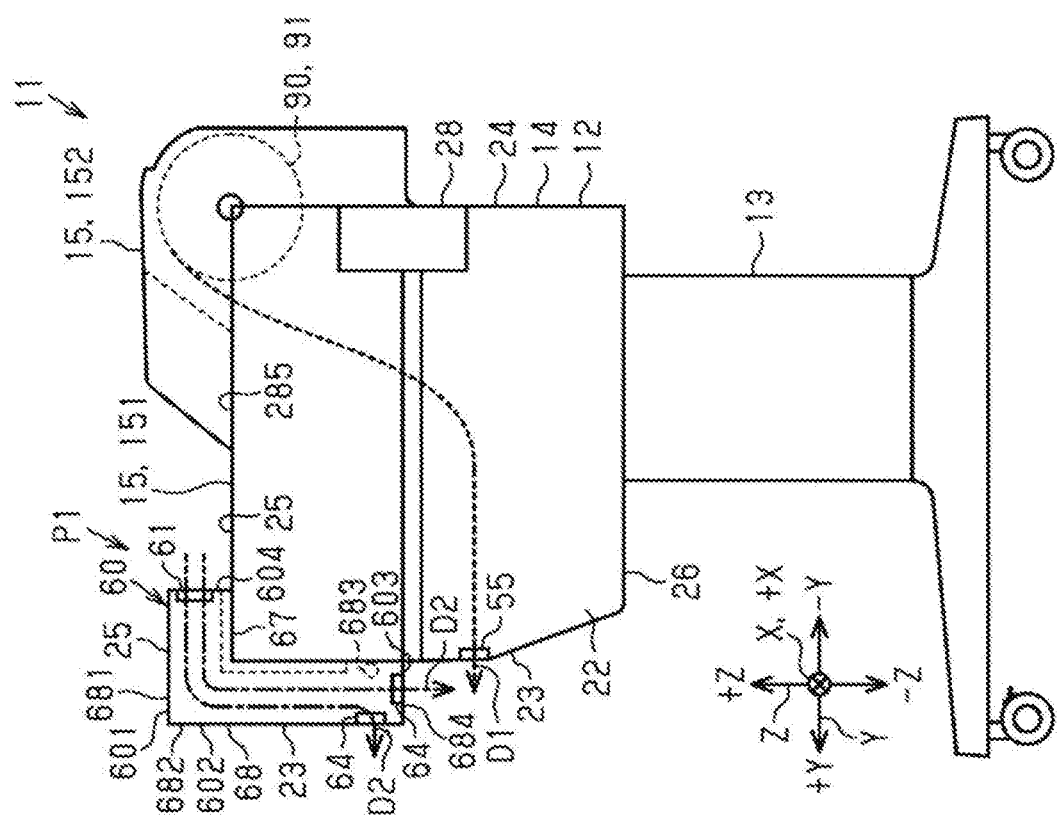
FIG. 10 is a schematic view illustrating a second modified example and a third modified example of the scanner apparatus.

FIG. 10 schematically illustrates the scanner apparatus 11 of a second modified example and a third modified example. In the scanner apparatus 11 of the second modified example and the third modified example, the scanning function unit 60 has an L shape that bends, extending across the top face 25 and the front face 23 of the main body 12, as viewed from the X axis direction. The top face 681 of the scanning unit cover 68, which is the top face 601 of the scanning function unit 60, does not exist on the same plane as the top face 285 of the exterior casing 28, but constitutes the top face 25 of the main body 12.

The scanning function unit 60 of the second modified example includes the insertion port 61 on a rear face 604 facing the −Y direction, and includes the discharge port 64 on the front face 602 facing the +Y direction. In the second modified example, the discharge direction D2 of the medium 95 is a direction on the +Y direction side. The scanning function unit 60 of the third modified example includes the insertion port 61 on the rear face 604 facing the −Y direction, and includes the discharge port 64 on the bottom face 603 facing the −Z direction.

In the third modified example, the discharge direction D2 of the medium 95 is the −Z direction.

In the second modified example and the third modified example, the rear face 604 may be a face, facing the −Y direction, of the scanning unit cover 68, a face, facing the −Y direction, of the fixing unit 67, or a combination of these. In the second modified example and the third modified example, the insertion port 61 may be provided to the top face 601, facing the +Z direction, of the scanning function unit 60.

Figure 11:
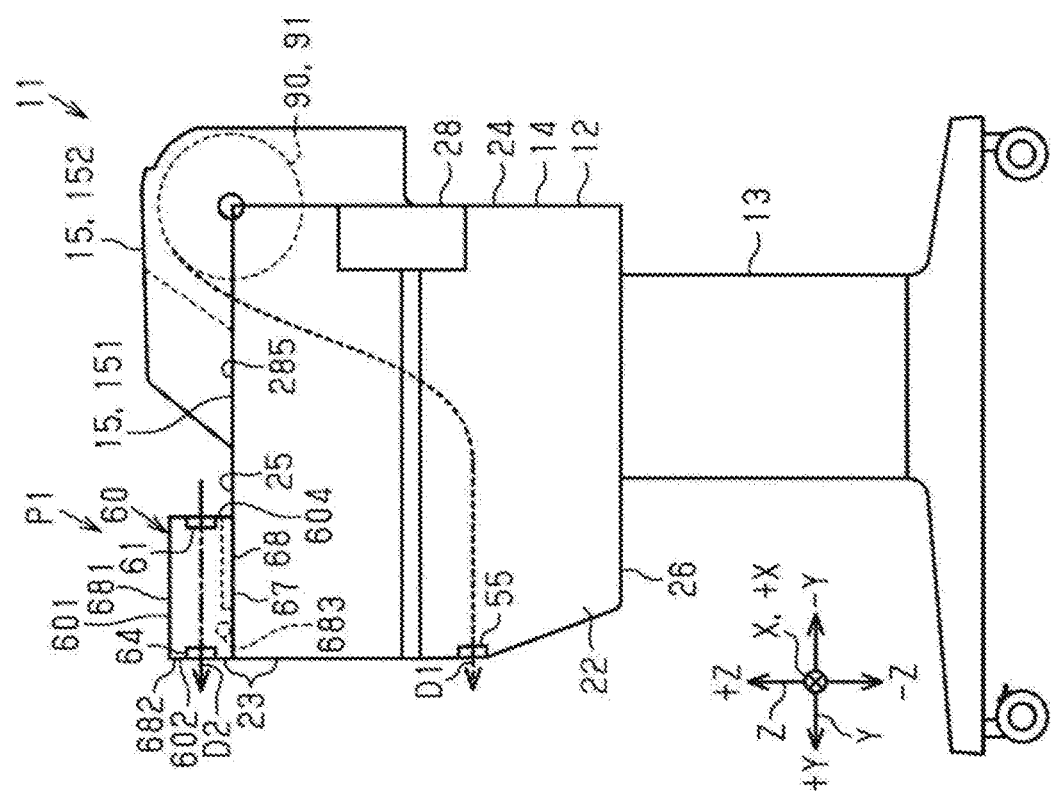
FIG. 11 is a perspective view illustrating a fourth modified example of the scanner apparatus.

FIG. 11 schematically illustrates the scanner apparatus 11 of a fourth modified example. In the scanner apparatus 11 of the fourth modified example, the scanning function unit 60 has an I shape extending in the Y axis direction in the top face 25 of the main body 12.

The scanning function unit 60 of the fourth modified example includes the insertion port 61 on the rear face 604 facing the −Y direction, and includes the discharge port 64 on the front face 602 facing the +Y direction. That is, in the fourth modified example, the discharge direction D2 of the medium 95 is a direction on the +Y direction side. In the fourth modified example, the insertion port 61 may be provided to the top face 601, facing the +Z direction, of the scanning function unit 60.

Figure 12:
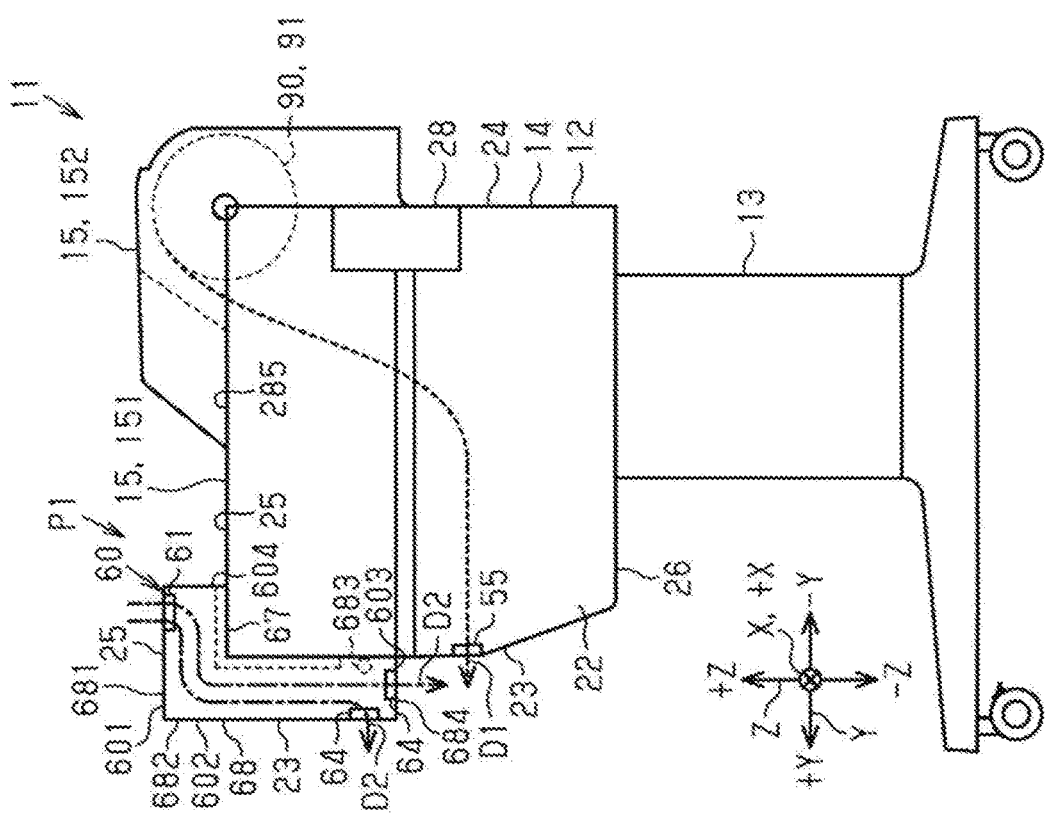
FIG. 12 is a perspective view illustrating a fifth modified example and a sixth modified example of the scanner apparatus.

FIG. 12 schematically illustrates the scanner apparatus 11 of a fifth modified example and a sixth modified example. In the scanner apparatus 11 of the fifth modified example and the sixth modified example, the scanning function unit 60 has an L shape that bends, extending across the top face 25 and the front face 23 of the main body 12, as viewed from the X axis direction. The top face 681 of the scanning unit cover 68, which is the top face 601 of the scanning function unit 60, does not exist on the same plane as the top face 285 of the exterior casing 28, but constitutes the top face 25 of the main body 12.

The scanning function unit 60 of the fifth modified example includes the insertion port 61 on the top face 601 facing the +Z direction, and includes the discharge port 64 on the front face 602 facing the +Y direction. In the fifth modified example, the discharge direction D2 of the medium 95 is a direction on the +Y direction side. The scanning function unit 60 of the sixth modified example includes the insertion port 61 on the top face 601 facing the +Z direction, and includes the discharge port 64 on the bottom face 603 facing the −Z direction. In the sixth modified example, the discharge direction D2 of the medium 95 is the −Z direction.

In the fifth modified example and the sixth modified example, the rear face 604, facing the −Y direction, of the scanning function unit 60, may be a face, facing the −Y direction, of the scanning unit cover 68, a face, facing the −Y direction, of the fixing unit 67, or a combination of these.

Figure 13:
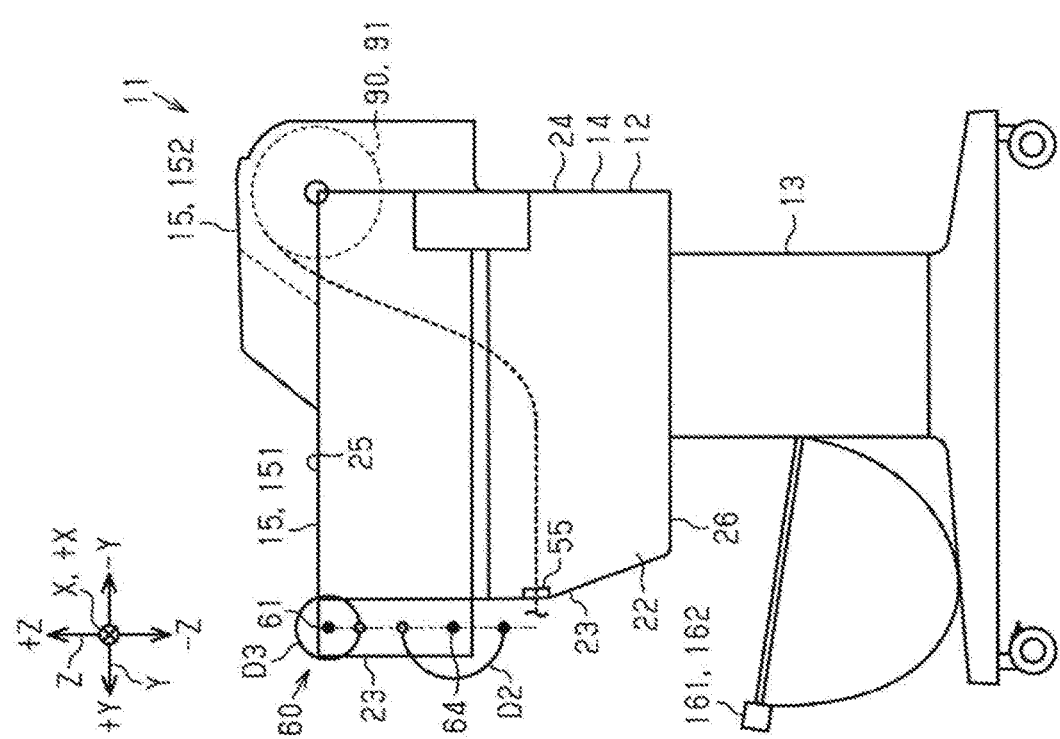
FIG. 13 is a schematic view illustrating an insertion direction of a medium relative to a scanning insertion port and illustrating a discharge direction of a medium in a scanning discharge port.

As illustrated in FIG. 13, the insertion direction D3 of the medium 95 in the insertion port 61 is not limited to a direction on the −Z direction side. That is, the insertion direction D3 of the medium 95 in the insertion port 61 is selectable as desired within a range excluding the +Z direction. Note that, to reduce bending from the insertion port 61 to the second end 952, the insertion direction D3 is preferably selected as desired within a range excluding the −Y direction side. In one example, the circle surrounding insertion port 61 may, by way of example and not limitation, represent a plurality of starting points of the insertion direction D3. Thus, the +Z direction as an insertion direction, whose starting point is −Z direction, is excluded in one example.

As illustrated in FIG. 13, the discharge direction D2 of the medium 95 in the discharge port 64 is not limited to a direction on the +Y direction side. The discharge direction D2 is selectable as desired within a range excluding the +Z direction and a direction on the −Y direction side. That is, the discharge direction D2 may be the −Z direction. Further, the discharge direction D2 may be a direction on the Y direction side that is further inclined on the +Z direction side than the horizontal direction, or may be a direction on the Y direction side that is further inclined on the −Z direction side than the horizontal direction.

As illustrated in FIG. 13, the scanner apparatus 11 may include a scanning medium receiver 161 that receives the medium 95 discharged from the discharge port 64. The scanner apparatus 11 may include a printing medium receiver 162 that receives the medium 90 discharged from the discharge port 55. The scanning medium receiver 161 and the printing medium receiver 162 may be combined into a common receiver or mutually independent.

The insertion port 61 opens on the top face 25 of the main body 12, and may be provided to a portion different from that in the exemplary embodiment described above when the insertion portion 61 is a portion of the housing 14 on the +Y direction side. For example, the insertion port 61 may open on a corner portion where the front face 23 and the top face 25 of the main body 12 connect. Further, the discharge port 64 may be provided to a portion different from that in the exemplary embodiment described above when the discharge port 64 is a portion of the housing 14 on the +Y direction side.

The scanning function unit 60 may include a pair of discharge port rollers in the discharge port 64 in place of the flap 85. When the medium 95 is fed while sandwiched by the pair of discharge port rollers, the discharge direction D2 of the medium 95 is a tangential direction of a contact portion of the discharge port rollers. That is, the pair of discharge port rollers is an example of a regulating unit that regulates the discharge direction D2 of the medium 95.

The first placement face 151 may be inclined as long as it is positioned within a range allowing placement of the object to be placed.

The first placement face 151 may have a structure of concave unit, a convex unit, or the like, as long as it is positioned within a range allowing placement of the object to be placed.

In the first placement face 151, the top face 285 of the exterior casing 28, the top face 311 of the viewing hole cover 31, and the top face 681 of the scanning unit cover 68 do not need to be included in the same plane. That is, a portion of the top face 285 of the exterior casing 28, the top face 311 of the viewing hole cover 31, and the top face 681 of the scanning unit cover 68 may deviate in the +Z direction or the −Z direction relative to the other faces.

The first placement face 151 is not limited to an overall flat face. For example, the first placement face 151 may curve in the +Z direction or the −Z direction.

The second placement face 152 may be an overall flat face. In this case, the first placement face 151 and the second placement face 152 may be included or not included in the same plane.

The first placement face 151 may include only the top face 285 of the exterior casing 28, may include only the top face 311 of the viewing hole cover 31, or may include a combination of these. That is, the top face 681 of the scanning unit cover 68 does not need to constitute the placement face 15 or portion of the placement face 15. Further, the scanning unit cover 68 does not need to include a top face facing the +Z direction.

The placement face 15 is separated from the insertion port 61 in the −Y direction.

The accommodating unit cover 40 does not need to constitute the placement face 15 or a portion thereof. The scanner apparatus 11 does not need to include the accommodating unit cover 40.

The position of the assisting symbol 685 is not limited to the top face 681 of the scanning unit cover 68. The assisting symbol 685 may be provided to or on the outer surface of the scanning unit cover 68 on the side opposite to the cover-side guide face 71 in the Z axis direction. According to this modified example, the assisting symbol 685 is close to the insertion port 61, making it easier to position the medium 95.

The printing function unit 18 may include a cutting unit that cuts the medium 90, on the downstream side of the printing unit 50 in the conveying direction.

The scanning function unit 60 is not limited to a configuration for scanning the medium 95 and generating color image data. The scanning function unit 60 may be configured to generate image data of a single color or in grayscale. In this case, the scanning unit 63 may irradiate light of a single color and scan the light reflected from the medium 95. Further, in the scanning unit 63, the light irradiated on the medium 95 is not limited to visible light.

The scanning function unit 60 is not limited to a configuration for scanning the medium 95 and generating image data. As the scanning unit 63, a color measurement unit that measures the color of the medium 95 may be included.

In place of the scanning function unit 60, a processing unit including at least the insertion port 61, the conveying unit 62 (conveying roller 622), and the discharge port 64 may be provided. As the processing unit, for example, a cutting mechanism that cuts the medium or a laminator that processes the surface of the medium may be provided.

The scanning unit 63 is not limited to include a plurality of CIS modules 80. The scanning unit 63 may be configured to include a single CIS module 80 extending across the entire width of the conveying path of the medium 95 in the X axis direction.

The CIS module 80 constituting the scanning unit 63 may be configured so that the light source irradiates red light, blue light, and green light onto the medium 95 while switching these light colors, and the reflected light is scanned by the photoreceptor elements for each color of light sequentially switched.

The pivoting direction of the scanning unit cover 68 is not limited to that in the exemplary embodiment. The cover shaft 683 of the scanning unit cover 68 may extend in the X axis direction on a portion of the scanning unit cover 68 on the +Z direction side. In this case, the open position P2 of the scanning unit cover 68 is a position pivoted to the +Z direction side.

The cover shaft 683 of the scanning unit cover 68 may extend in the Z axis direction on either of both ends of the scanning unit cover 68 in the X axis direction. In this case, the scanning unit cover 68 is pivotable in the Y axis direction. The scanning unit cover 68 may be divided into a +X direction side and a −X direction side. In this case, the divided scanning unit covers 68 may be pivotably supported in the Z axis direction and the Y axis direction, respectively. In this way, the first position and the second position of the scanning unit cover 68 can be changed as desired in accordance with the structure for making the scanning unit cover 68 openable and closeable.

The scanning unit cover 68 may be configured to be openable and closeable by being slid in the X axis direction or the Z axis direction. Further, the scanning unit cover 68 may be configured to be detachable from the fixing unit 67.

The scanning function unit 60 may be configured so that the scanning unit cover 68 includes the biasing mechanism 83, and the fixing unit 67 includes the scanning unit 63. The scanning function unit 60 may be configured to include the scanning unit 63 in both the fixing unit 67 and the scanning unit cover 68. That is, the scanning function unit 60 may be configured to allow scanning of one side, or may be configured to allow scanning of both sides of the medium 95.

The printing function unit 18 may be a page printer that performs printing page-by-page. That is, the medium 90 is not limited to an elongated medium, and may be a short medium.

The printing medium 90 and the scanning medium 95 may be media of the same type, or media of different types.

In the scanner apparatus 11, the insertion port 61 may be configured to be also used as an insertion port for inserting the printing medium 90. In this case, the placement face 15 is convenient in allowing placement of a portion of the printing medium 90 not inserted into the insertion port 61. Further, when a scanning result of the medium 95 is verified using the terminal device 105, the placement face 15 is convenient in allowing placement of the terminal device 105.

The scanner apparatus 11 does not need to include the legs 13.

The scanner apparatus 11 does not need to include the printing function unit 18. That is, the scanner apparatus 11 may be configured as a single function device having a scanning function only.

The scanner apparatus 11 may have any one or a plurality of functions among a print function, a communication function, a platemaking function, a copy function, a scan function, and the like. The print function can be realized by the printing function unit 18. The communication function can be realized by including a communication unit that sends image data generated by scanning the medium 95 via a local area network, the Internet, or an electric communication line. The platemaking function can be realized by a copying unit that physically copies the medium 95 on the basis of image data generated by scanning the medium 95.

What is claimed is:

1. A multifunction apparatus comprising:
a scanning unit configured to scan a scanning medium,
a printing unit configured to perform printing on a printing medium, and
a housing configured to house the scanning unit and the printing unit, wherein the housing includes a scanning insertion port into which a scanning medium to be scanned is inserted, a scanning discharge port from which the scanning medium scanned is discharged, and a printing discharge port from which the printing medium printed by the printing unit is discharged;
wherein the housing includes:
a first surface where the scanning insertion port is placed, and
a second surface that extends in a direction intersecting the first surface and that is arranged adjacent to a first end side of the first surface, wherein the scanning discharge port and the printing discharge port are placed in the second surface.

2. The multifunction apparatus according to claim 1, wherein:
the first surface of the housing includes a placement face that extends from the scanning insertion port to a second end side that is opposite to the first end side, wherein the placement face, when a first end of the scanning medium is inserted into the scanning insertion port, is configured to support a portion of the scanning medium on a second end side opposite to the first end.

3. The multifunction apparatus according to claim 2, the housing further comprising:
an accommodating unit configured to accommodate a printing medium wound into a roll shape, and
an accommodating unit cover, wherein
a conveying path along which the medium is conveyed extends in a direction from the scanning insertion port to the scanning discharge port, and
the accommodating portion is provided on the first surface side of the housing on the second end side, and
an outer surface of the accommodating unit cover is included in the placement face.

4. The multifunction apparatus according to claim 2, wherein the scanning discharge port is positioned vertically lower than the placement face and the scanning insertion port of the housing.

5. The multifunction apparatus according to claim 1, further comprising:
   a holding mechanism configured to hold the medium inserted from the scanning insertion port, wherein:
   the housing includes an assisting symbol for assisting determination of an insertion position of the medium relative to the scanning insertion port, and
   the holding mechanism and the assisting symbol are provided on the first end side of the housing.

6. The multifunction apparatus according to claim 1, further comprising:
   a scanning unit cover including the scanning unit or a region facing the scanning unit, wherein:
   the scanning unit cover is movable to a first position that allows the medium to be scanned by the scanning unit, and to a second position that causes a scanning position by the scanning unit to be exposed, and
   when the scanning unit cover is positioned in the first position, an outer surface of the scanning unit cover is included in the second face.

7. The multifunction apparatus according to claim 6, further comprising:
   an accommodating unit configured to accommodate a printing medium wound into a roll shape; and
   an accommodating unit cover, wherein
   an outer surface of the accommodating unit cover is included in the first face.

8. The multifunction apparatus according to claim 6, wherein the scanning unit cover is configured to pivot to the first position and the second position about a pivoting shaft.

9. The multifunction apparatus according to claim 6, wherein a length of the scanning unit cover in an axial direction of the pivoting shaft is greater than a length of the scanning unit cover in a direction orthogonal to the axial direction.

10. The multifunction apparatus according to claim 8, further comprising:
    a conveying roller configured to convey a medium inserted from the scanning insertion port to the scanning position, wherein
    an axial direction of the pivoting shaft is parallel with an axial direction of the conveying roller,
    the pivoting shaft is positioned on a vertically downward direction side of the scanning unit cover, and
    the scanning unit is positioned on a vertically upward direction side of the pivoting shaft when the scanning unit cover is positioned in the first position.

\* \* \* \* \*